United States Patent
Ulrich et al.

(10) Patent No.: US 10,686,583 B2
(45) Date of Patent: Jun. 16, 2020

(54) METHOD FOR MEASURING AND CORRECTING MULTI-WIRE SKEW

(71) Applicant: Kandou Labs, S.A., Lausanne (CH)

(72) Inventors: Roger Ulrich, Bern (CH); Armin Tajalli, Chavannes près Renens (CH); Ali Hormati, Ecublens (CH); Richard Simpson, Bedford (GB)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 15/641,313

(22) Filed: Jul. 4, 2017

(65) Prior Publication Data

US 2019/0013927 A1 Jan. 10, 2019

(51) Int. Cl.
| | |
|---|---|
| *H04L 7/00* | (2006.01) |
| *H04L 25/14* | (2006.01) |
| *H04L 7/033* | (2006.01) |
| *H04L 25/49* | (2006.01) |
| *H04L 25/03* | (2006.01) |

(52) U.S. Cl.
CPC .......... *H04L 7/0016* (2013.01); *H04L 7/0054* (2013.01); *H04L 7/0079* (2013.01); *H04L 7/033* (2013.01); *H04L 25/03* (2013.01); *H04L 25/03057* (2013.01); *H04L 25/14* (2013.01); *H04L 25/49* (2013.01); *H04L 25/4904* (2013.01); *H04L 7/0025* (2013.01); *H04L 25/03878* (2013.01); *H04L 2025/03356* (2013.01)

(58) Field of Classification Search
CPC ..... H04L 7/033; H04L 7/0087; H04L 7/0025; H04L 7/0016; H04L 7/0037; H04L 25/03057; H04L 7/0079; H04L 5/0048; H04L 25/03146; H04L 25/03949

USPC .......................................... 375/355; 327/160
See application file for complete search history.

(56) References Cited

U.S. PATENT DOCUMENTS

| | | | |
|---|---|---|---|
| 668,687 | A | 2/1901 | Mayer |
| 780,883 | A | 1/1905 | Hinchman |
| 3,196,351 | A | 7/1965 | Slepian |

(Continued)

FOREIGN PATENT DOCUMENTS

| | | |
|---|---|---|
| CN | 1864346 | 11/2006 |
| CN | 101478286 | 7/2009 |
| EP | 1926267 | 5/2008 |
| EP | 2039221 | 2/2013 |

(Continued)

OTHER PUBLICATIONS

"Introduction to: Analog Computers and the DSPACE System," Course Material ECE 5230 Spring 2008, Utah State University, www.coursehero.com, 12 pages.

(Continued)

*Primary Examiner* — David C Payne
*Assistant Examiner* — Sarah Hassan
(74) *Attorney, Agent, or Firm* — Invention Mine LLC

(57) ABSTRACT

Generating, during a first and second signaling interval, an aggregated data signal by forming a linear combination of wire signals received in parallel from wires of a multi-wire bus, wherein at least some of the wire signals undergo a signal level transition during the first and second signaling interval; measuring a signal skew characteristic of the aggregated data signal; and, generating wire-specific skew offset metrics, each wire-specific skew offset metric based on the signal skew characteristic.

20 Claims, 12 Drawing Sheets

(56) References Cited

U.S. PATENT DOCUMENTS

| | | |
|---|---|---|
| 3,636,463 A | 1/1972 | Ongkiehong |
| 3,939,468 A | 2/1976 | Mastin |
| 4,163,258 A | 7/1979 | Ebihara |
| 4,181,967 A | 1/1980 | Nash |
| 4,206,316 A | 6/1980 | Burnsweig |
| 4,276,543 A | 6/1981 | Miller |
| 4,486,739 A | 12/1984 | Franaszek |
| 4,499,550 A | 2/1985 | Ray, III et al. |
| 4,722,084 A | 1/1988 | Morton |
| 4,772,845 A | 9/1988 | Scott |
| 4,774,498 A | 9/1988 | Traa |
| 4,864,303 A | 9/1989 | Ofek |
| 4,897,657 A | 1/1990 | Brubaker |
| 4,974,211 A | 11/1990 | Corl |
| 5,017,924 A | 5/1991 | Guiberteau |
| 5,053,974 A | 10/1991 | Penz |
| 5,166,956 A | 11/1992 | Baltus |
| 5,168,509 A | 12/1992 | Nakamura |
| 5,266,907 A | 11/1993 | Dacus |
| 5,283,761 A | 2/1994 | Gillingham |
| 5,287,305 A | 2/1994 | Yoshida |
| 5,311,516 A | 5/1994 | Kuznicki |
| 5,331,320 A | 7/1994 | Cideciyan |
| 5,334,956 A | 8/1994 | Leding et al. |
| 5,412,689 A | 5/1995 | Chan |
| 5,449,895 A | 9/1995 | Hecht |
| 5,459,465 A | 10/1995 | Kagey |
| 5,461,379 A | 10/1995 | Weinman |
| 5,510,736 A | 4/1996 | Van De Plassche |
| 5,511,119 A | 4/1996 | Lechleider |
| 5,553,097 A | 9/1996 | Dagher |
| 5,566,193 A | 10/1996 | Cloonan |
| 5,599,550 A | 2/1997 | Kohlruss |
| 5,626,651 A | 5/1997 | Dullien |
| 5,629,651 A | 5/1997 | Mizuno |
| 5,659,353 A | 8/1997 | Kostreski |
| 5,727,006 A | 3/1998 | Dreyer |
| 5,748,948 A | 5/1998 | Yu |
| 5,798,563 A | 8/1998 | Feilchenfeld et al. |
| 5,802,356 A | 9/1998 | Gaskins |
| 5,825,808 A | 10/1998 | Hershey |
| 5,856,935 A | 1/1999 | Moy |
| 5,875,202 A | 2/1999 | Venters |
| 5,945,935 A | 8/1999 | Kusumoto |
| 5,949,060 A | 9/1999 | Schattschneider |
| 5,982,954 A | 11/1999 | Delen |
| 5,995,016 A | 11/1999 | Perino |
| 6,005,895 A | 12/1999 | Perino |
| 6,084,883 A | 7/2000 | Norrell |
| 6,119,263 A | 9/2000 | Mowbray |
| 6,172,634 B1 | 1/2001 | Leonowich |
| 6,175,230 B1 | 1/2001 | Hamblin |
| 6,232,908 B1 | 5/2001 | Nakaigawa |
| 6,278,740 B1 | 8/2001 | Nordyke |
| 6,316,987 B1 | 11/2001 | Dally |
| 6,346,907 B1 | 2/2002 | Dacy |
| 6,359,931 B1 | 3/2002 | Perino |
| 6,378,073 B1 | 4/2002 | Davis |
| 6,384,758 B1 | 5/2002 | Michalski |
| 6,398,359 B1 | 6/2002 | Silverbrook |
| 6,404,820 B1 | 6/2002 | Postol |
| 6,417,737 B1 | 7/2002 | Moloudi |
| 6,433,800 B1 | 8/2002 | Holtz |
| 6,452,420 B1 | 9/2002 | Wong |
| 6,473,877 B1 | 10/2002 | Sharma |
| 6,483,828 B1 | 11/2002 | Balachandran |
| 6,504,875 B2 | 1/2003 | Perino |
| 6,509,773 B2 | 1/2003 | Buchwald |
| 6,522,699 B1 | 2/2003 | Anderson |
| 6,556,628 B1 | 4/2003 | Poulton |
| 6,563,382 B1 | 5/2003 | Yang |
| 6,621,427 B2 | 9/2003 | Greenstreet |
| 6,624,699 B2 | 9/2003 | Yin |
| 6,650,638 B1 | 11/2003 | Walker |
| 6,661,355 B2 | 12/2003 | Cornelius |
| 6,664,355 B2 | 12/2003 | Kim |
| 6,686,879 B2 | 2/2004 | Shattil |
| 6,690,739 B1 | 2/2004 | Mui |
| 6,766,342 B2 | 7/2004 | Kechriotis |
| 6,772,351 B1 | 8/2004 | Werner |
| 6,839,429 B1 | 1/2005 | Gaikwad |
| 6,839,587 B1 | 1/2005 | Yonce |
| 6,854,030 B2 | 2/2005 | Perino |
| 6,865,234 B1 | 3/2005 | Agazzi |
| 6,865,236 B1 | 3/2005 | Terry |
| 6,876,317 B2 | 4/2005 | Sankaran |
| 6,898,724 B2 | 5/2005 | Chang |
| 6,927,709 B2 | 8/2005 | Kiehl |
| 6,954,492 B1 | 10/2005 | Williams |
| 6,963,622 B2 | 11/2005 | Eroz |
| 6,972,701 B2 | 12/2005 | Jansson |
| 6,973,613 B2 | 12/2005 | Cypher |
| 6,976,194 B2 | 12/2005 | Cypher |
| 6,982,954 B2 | 1/2006 | Dhong |
| 6,990,138 B2 | 1/2006 | Bejjani |
| 6,993,311 B2 | 1/2006 | Li |
| 6,999,516 B1 | 2/2006 | Rajan |
| 7,023,817 B2 | 4/2006 | Kuffner |
| 7,039,136 B2 | 5/2006 | Olson |
| 7,053,802 B2 | 5/2006 | Cornelius |
| 7,075,996 B2 | 7/2006 | Simon |
| 7,080,288 B2 | 7/2006 | Ferraiolo |
| 7,082,557 B2 | 7/2006 | Schauer |
| 7,085,153 B2 | 8/2006 | Ferrant |
| 7,085,336 B2 | 8/2006 | Lee |
| 7,123,660 B2 | 10/2006 | Haq et al. |
| 7,127,003 B2 | 10/2006 | Rajan |
| 7,130,944 B2 | 10/2006 | Perino |
| 7,142,612 B2 | 11/2006 | Horowitz |
| 7,142,865 B2 | 11/2006 | Tsai |
| 7,145,411 B1 | 12/2006 | Blair |
| 7,164,631 B2 | 1/2007 | Tateishi |
| 7,167,019 B2 | 1/2007 | Broyde |
| 7,176,823 B2 | 2/2007 | Zabroda |
| 7,180,949 B2 | 2/2007 | Kleveland |
| 7,184,483 B2 | 2/2007 | Rajan |
| 7,199,728 B2 | 4/2007 | Dally |
| 7,231,558 B2 | 6/2007 | Gentieu |
| 7,269,130 B2 | 9/2007 | Pitio |
| 7,269,212 B1 | 9/2007 | Chau |
| 7,335,976 B2 | 2/2008 | Chen |
| 7,336,112 B1 | 2/2008 | Sha |
| 7,336,139 B2 | 2/2008 | Blair |
| 7,339,990 B2 | 3/2008 | Hidaka |
| 7,346,819 B2 | 3/2008 | Bansal |
| 7,348,989 B2 | 3/2008 | Stevens |
| 7,349,484 B2 | 3/2008 | Stojanovic |
| 7,356,213 B1 | 4/2008 | Cunningham |
| 7,358,869 B1 | 4/2008 | Chiarulli |
| 7,362,130 B2 | 4/2008 | Broyde |
| 7,362,697 B2 | 4/2008 | Becker |
| 7,366,942 B2 | 4/2008 | Lee |
| 7,370,264 B2 | 5/2008 | Worley |
| 7,372,390 B2 | 5/2008 | Yamada |
| 7,389,333 B2 | 6/2008 | Moore |
| 7,397,302 B2 | 7/2008 | Bardsley |
| 7,400,276 B1 | 7/2008 | Sotiriadis |
| 7,428,273 B2 | 9/2008 | Foster |
| 7,456,778 B2 | 11/2008 | Werner |
| 7,462,956 B2 | 12/2008 | Lan |
| 7,496,162 B2 | 2/2009 | Srebranig |
| 7,570,704 B2 | 4/2009 | Nagarajan |
| 7,535,957 B2 | 5/2009 | Ozawa |
| 7,539,532 B2 | 5/2009 | Tran |
| 7,599,390 B2 | 10/2009 | Pamarti |
| 7,613,234 B2 | 11/2009 | Raghavan |
| 7,616,075 B2 | 11/2009 | Kushiyama |
| 7,620,116 B2 | 11/2009 | Bessios |
| 7,633,850 B2 | 12/2009 | Nagarajan |
| 7,639,596 B2 | 12/2009 | Cioffi |
| 7,643,588 B2 | 1/2010 | Visalli |
| 7,650,525 B1 | 1/2010 | Chang |
| 7,656,321 B2 | 2/2010 | Wang |
| 7,694,204 B2 | 4/2010 | Schmidt |

(56) References Cited

U.S. PATENT DOCUMENTS

| | | |
|---|---|---|
| 7,697,915 B2 | 4/2010 | Behzad |
| 7,698,088 B2 | 4/2010 | Sul |
| 7,706,456 B2 | 4/2010 | Laroia |
| 7,706,524 B2 | 4/2010 | Zerbe |
| 7,746,764 B2 | 6/2010 | Rawlins |
| 7,768,312 B2 | 8/2010 | Hirose |
| 7,787,572 B2 | 8/2010 | Scharf |
| 7,804,361 B2 | 9/2010 | Lim |
| 7,808,456 B2 | 10/2010 | Chen |
| 7,808,883 B2 | 10/2010 | Green |
| 7,841,909 B2 | 11/2010 | Murray |
| 7,869,497 B2 | 1/2011 | Benvenuto |
| 7,869,546 B2 | 1/2011 | Tsai |
| 7,882,413 B2 | 2/2011 | Chen |
| 7,899,653 B2 | 3/2011 | Hollis |
| 7,907,676 B2 | 3/2011 | Stojanovic |
| 7,933,770 B2 | 4/2011 | Kruger |
| 8,000,664 B2 | 8/2011 | Khorram |
| 8,030,999 B2 | 10/2011 | Chatterjee |
| 8,036,300 B2 | 10/2011 | Evans |
| 8,050,332 B2 | 11/2011 | Chung |
| 8,055,095 B2 | 11/2011 | Palotai |
| 8,064,535 B2 | 11/2011 | Wiley |
| 8,085,172 B2 | 12/2011 | Li |
| 8,091,006 B2 | 1/2012 | Prasad |
| 8,106,806 B2 | 1/2012 | Toyomura |
| 8,149,906 B2 | 4/2012 | Saito |
| 8,159,375 B2 | 4/2012 | Abbasfar |
| 8,159,376 B2 | 4/2012 | Abbasfar |
| 8,180,931 B2 | 5/2012 | Lee |
| 8,185,807 B2 | 5/2012 | Oh |
| 8,199,849 B2 | 6/2012 | Oh |
| 8,199,863 B2 | 6/2012 | Chen |
| 8,218,670 B2 | 7/2012 | AbouRjeily |
| 8,233,544 B2 | 7/2012 | Bao |
| 8,245,094 B2 | 8/2012 | Jiang |
| 8,253,454 B2 | 8/2012 | Lin |
| 8,279,094 B2 | 10/2012 | Abbasfar |
| 8,279,745 B2 | 10/2012 | Dent |
| 8,289,914 B2 | 10/2012 | Li |
| 8,295,250 B2 | 10/2012 | Gorokhov |
| 8,295,336 B2 | 10/2012 | Lutz |
| 8,305,247 B2 | 11/2012 | Pun |
| 8,310,389 B1 | 11/2012 | Chui |
| 8,341,492 B2 | 12/2012 | Shen |
| 8,359,445 B2 | 1/2013 | Ware |
| 8,365,035 B2 | 1/2013 | Hara |
| 8,406,315 B2 | 3/2013 | Tsai |
| 8,406,316 B2 | 3/2013 | Sugita |
| 8,429,492 B2 | 4/2013 | Yoon |
| 8,429,495 B2 | 4/2013 | Przybylski |
| 8,437,440 B1 | 5/2013 | Zhang |
| 8,442,099 B1 | 5/2013 | Sederat |
| 8,442,210 B2 | 5/2013 | Zerbe |
| 8,443,223 B2 | 5/2013 | Abbasfar |
| 8,451,913 B2 | 5/2013 | Oh |
| 8,462,891 B2 | 6/2013 | Kizer |
| 8,472,513 B2 | 6/2013 | Malipatil |
| 8,620,166 B2 | 6/2013 | Dong |
| 8,498,344 B2 | 7/2013 | Wilson |
| 8,498,368 B1 | 7/2013 | Husted |
| 8,520,348 B2 | 8/2013 | Dong |
| 8,520,493 B2 | 8/2013 | Goulahsen |
| 8,539,318 B2 | 9/2013 | Cronie |
| 8,547,272 B2 | 10/2013 | Nestler |
| 8,577,284 B2 | 11/2013 | Seo |
| 8,578,246 B2 | 11/2013 | Mittelholzer |
| 8,588,254 B2 | 11/2013 | Diab |
| 8,588,280 B2 | 11/2013 | Oh |
| 8,593,305 B1 | 11/2013 | Tajalli |
| 8,602,643 B2 | 12/2013 | Gardiner |
| 8,604,879 B2 | 12/2013 | Mourant |
| 8,638,241 B2 | 1/2014 | Sudhakaran |
| 8,643,437 B2 | 2/2014 | Chiu |
| 8,649,445 B2 | 2/2014 | Cronie |
| 8,649,460 B2 | 2/2014 | Ware |
| 8,674,861 B2 | 3/2014 | Matsuno |
| 8,687,968 B2 | 4/2014 | Nosaka |
| 8,711,919 B2 | 4/2014 | Kumar |
| 8,718,184 B1 | 5/2014 | Cronie |
| 8,755,426 B1 | 6/2014 | Cronie |
| 8,773,964 B2 | 7/2014 | Hsueh |
| 8,780,687 B2 | 7/2014 | Clausen |
| 8,782,578 B2 | 7/2014 | Tell |
| 8,831,440 B2 | 9/2014 | Yu |
| 8,841,936 B2 | 9/2014 | Nakamura |
| 8,879,660 B1 | 11/2014 | Peng |
| 8,897,134 B2 | 11/2014 | Kern |
| 8,898,504 B2 | 11/2014 | Baumgartner |
| 8,938,171 B2 | 1/2015 | Tang |
| 8,949,693 B2 | 2/2015 | Ordentlich |
| 8,951,072 B2 | 2/2015 | Hashim |
| 8,975,948 B2 | 3/2015 | GonzalezDiaz |
| 8,989,317 B1 | 3/2015 | Holden |
| 9,015,566 B2 | 4/2015 | Cronie |
| 9,020,049 B2 | 4/2015 | Schwager |
| 9,036,764 B1 | 5/2015 | Hossain |
| 9,059,816 B1 | 6/2015 | Simpson |
| 9,069,995 B1 | 6/2015 | Cronie |
| 9,077,386 B1 | 7/2015 | Holden |
| 9,083,576 B1 | 7/2015 | Hormati |
| 9,093,791 B2 | 7/2015 | Liang |
| 9,100,232 B1 | 8/2015 | Hormati |
| 9,106,465 B2 | 8/2015 | Walter |
| 9,112,550 B1 | 8/2015 | Ulrich |
| 9,124,557 B2 | 9/2015 | Fox |
| 9,148,087 B1 | 9/2015 | Tajalli |
| 9,152,495 B2 | 10/2015 | Losh |
| 9,165,615 B2 | 10/2015 | Amirkhany |
| 9,172,412 B2 | 10/2015 | Kim |
| 9,178,503 B2 | 11/2015 | Hsieh |
| 9,183,085 B1 | 11/2015 | Northcott |
| 9,197,470 B2 | 11/2015 | Okunev |
| 9,281,785 B2 | 3/2016 | Sjoland |
| 9,288,082 B1 | 3/2016 | Ulrich |
| 9,288,089 B2 | 3/2016 | Cronie |
| 9,292,716 B2 | 3/2016 | Winoto |
| 9,300,503 B1 | 3/2016 | Holden |
| 9,306,621 B2 | 4/2016 | Zhang |
| 9,319,218 B2 | 4/2016 | Pandey |
| 9,331,962 B2 | 5/2016 | Lida |
| 9,362,974 B2 | 6/2016 | Fox |
| 9,363,114 B2 | 6/2016 | Shokrollahi |
| 9,374,250 B1 | 6/2016 | Musah |
| 9,397,868 B1 | 7/2016 | Hossain et al. |
| 9,401,828 B2 | 7/2016 | Cronie |
| 9,432,082 B2 | 8/2016 | Ulrich |
| 9,432,298 B1 | 8/2016 | Smith |
| 9,444,654 B2 | 9/2016 | Hormati |
| 9,455,744 B2 | 9/2016 | George |
| 9,455,765 B2 | 9/2016 | Schumacher |
| 9,461,862 B2 | 10/2016 | Holden |
| 9,479,369 B1 | 10/2016 | Shokrollahi |
| 9,509,437 B2 | 11/2016 | Shokrollahi |
| 9,544,015 B2 | 1/2017 | Ulrich |
| 9,577,815 B1 | 2/2017 | Simpson et al. |
| 9,596,109 B2 | 3/2017 | Fox et al. |
| 9,634,797 B2 | 4/2017 | Benammar |
| 9,667,379 B2 | 5/2017 | Cronie |
| 10,193,716 B2 | 1/2019 | Hormati et al. |
| 10,243,614 B1 | 3/2019 | Ulrich et al. |
| 10,313,068 B1 | 6/2019 | Ahmed et al. |
| 2001/0006538 A1 | 7/2001 | Simon |
| 2001/0055344 A1 | 12/2001 | Lee |
| 2002/0034191 A1 | 3/2002 | Shattil |
| 2002/0044316 A1 | 4/2002 | Myers |
| 2002/0057592 A1 | 5/2002 | Robb |
| 2002/0154633 A1 | 10/2002 | Shin |
| 2002/0163881 A1 | 11/2002 | Dhong |
| 2002/0167339 A1 | 11/2002 | Chang |
| 2002/0174373 A1 | 11/2002 | Chang |
| 2002/0181607 A1 | 12/2002 | Izumi |
| 2003/0016763 A1 | 1/2003 | Doi |
| 2003/0016770 A1 | 1/2003 | Trans |

(56) References Cited

U.S. PATENT DOCUMENTS

| | | |
|---|---|---|
| 2003/0046618 A1* | 3/2003 | Collins .................. H04L 25/14 714/700 |
| 2003/0085763 A1 | 5/2003 | Schrodinger |
| 2003/0146783 A1 | 8/2003 | Bandy |
| 2003/0174023 A1 | 9/2003 | Miyasita |
| 2003/0185310 A1 | 10/2003 | Ketchum |
| 2003/0218558 A1 | 11/2003 | Mulder |
| 2004/0027185 A1 | 2/2004 | Fiedler |
| 2004/0155802 A1 | 8/2004 | Lamy |
| 2004/0161019 A1 | 8/2004 | Raghavan |
| 2004/0169529 A1 | 9/2004 | Afghahi |
| 2004/0203834 A1 | 10/2004 | Mahany |
| 2005/0063493 A1 | 3/2005 | Foster |
| 2005/0134380 A1 | 6/2005 | Nairn |
| 2005/0174841 A1 | 8/2005 | Ho |
| 2005/0195000 A1 | 9/2005 | Parker |
| 2005/0201491 A1 | 9/2005 | Wei |
| 2005/0213686 A1 | 9/2005 | Love |
| 2005/0220182 A1 | 10/2005 | Kuwata |
| 2005/0270098 A1 | 12/2005 | Zhang |
| 2006/0036668 A1 | 2/2006 | Jaussi |
| 2006/0092969 A1 | 5/2006 | Susnow et al. |
| 2006/0097786 A1 | 5/2006 | Su |
| 2006/0103463 A1 | 5/2006 | Lee |
| 2006/0120486 A1 | 6/2006 | Visalli |
| 2006/0126751 A1 | 6/2006 | Bessios |
| 2006/0133538 A1 | 6/2006 | Stojanovic |
| 2006/0140324 A1 | 6/2006 | Casper |
| 2006/0159005 A1 | 7/2006 | Rawlins |
| 2006/0233291 A1 | 10/2006 | Garlepp |
| 2007/0001723 A1 | 1/2007 | Lin |
| 2007/0002954 A1 | 1/2007 | Cornelius |
| 2007/0030706 A1 | 2/2007 | Green |
| 2007/0103338 A1* | 5/2007 | Teo ..................... G06F 13/4018 340/933 |
| 2007/0121716 A1 | 5/2007 | Nagarajan |
| 2007/0182487 A1 | 8/2007 | Ozasa |
| 2007/0201546 A1 | 8/2007 | Lee |
| 2007/0204205 A1 | 8/2007 | Niu |
| 2007/0263711 A1 | 11/2007 | Kramer |
| 2007/0283210 A1 | 12/2007 | Prasad |
| 2008/0007367 A1 | 1/2008 | Kim |
| 2008/0012598 A1 | 1/2008 | Mayer |
| 2008/0104374 A1 | 5/2008 | Mohamed |
| 2008/0159448 A1 | 7/2008 | Anim-Appiah |
| 2008/0175586 A1* | 7/2008 | Perkins ................. H04B 10/27 398/2 |
| 2008/0317188 A1 | 12/2008 | Staszewski |
| 2009/0059782 A1 | 3/2009 | Cole |
| 2009/0115523 A1 | 5/2009 | Akizuki |
| 2009/0154604 A1 | 6/2009 | Lee |
| 2009/0195281 A1 | 8/2009 | Tamura |
| 2009/0262876 A1 | 10/2009 | Arima |
| 2009/0316730 A1 | 12/2009 | Feng |
| 2009/0323864 A1 | 12/2009 | Tired |
| 2010/0046644 A1 | 2/2010 | Mazet |
| 2010/0081451 A1 | 4/2010 | Mueck |
| 2010/0148819 A1 | 6/2010 | Bae |
| 2010/0153792 A1 | 6/2010 | Jang |
| 2010/0180143 A1 | 7/2010 | Ware |
| 2010/0215087 A1 | 8/2010 | Tsai |
| 2010/0215112 A1 | 8/2010 | Tsai |
| 2010/0271107 A1 | 10/2010 | Tran |
| 2010/0283894 A1 | 11/2010 | Horan |
| 2010/0296556 A1 | 11/2010 | Rave |
| 2010/0309964 A1 | 12/2010 | Oh |
| 2011/0014865 A1 | 1/2011 | Seo |
| 2011/0028089 A1 | 2/2011 | Komori |
| 2011/0032977 A1 | 2/2011 | Hsiao |
| 2011/0051854 A1 | 3/2011 | Kizer |
| 2011/0072330 A1 | 3/2011 | Kolze |
| 2011/0074488 A1 | 3/2011 | Broyde |
| 2011/0084737 A1 | 4/2011 | Oh |
| 2011/0103508 A1 | 5/2011 | Mu |
| 2011/0127990 A1 | 6/2011 | Wilson |
| 2011/0156757 A1 | 6/2011 | Hayashi |
| 2011/0228864 A1 | 9/2011 | Aryanfar |
| 2011/0235501 A1 | 9/2011 | Goulahsen |
| 2011/0268225 A1 | 11/2011 | Cronie |
| 2011/0299555 A1 | 12/2011 | Cronie |
| 2011/0302478 A1 | 12/2011 | Cronie |
| 2011/0317559 A1 | 12/2011 | Kern |
| 2012/0020660 A1 | 1/2012 | Le et al. |
| 2012/0050079 A1 | 3/2012 | Goldman et al. |
| 2012/0082203 A1 | 4/2012 | Zerbe |
| 2012/0133438 A1 | 5/2012 | Tsuchi |
| 2012/0152901 A1 | 6/2012 | Nagorny |
| 2012/0161945 A1 | 6/2012 | Single |
| 2012/0213299 A1 | 8/2012 | Cronie |
| 2012/0257683 A1 | 10/2012 | Schwager |
| 2013/0010892 A1 | 1/2013 | Cronie |
| 2013/0013870 A1 | 1/2013 | Cronie |
| 2013/0106513 A1 | 5/2013 | Cyrusian |
| 2013/0114519 A1 | 5/2013 | Gaal |
| 2013/0114663 A1 | 5/2013 | Ding |
| 2013/0129019 A1 | 5/2013 | Sorrells |
| 2013/0147553 A1 | 6/2013 | Iwamoto |
| 2013/0188656 A1 | 7/2013 | Ferraiolo |
| 2013/0195155 A1 | 8/2013 | Pan |
| 2013/0202065 A1 | 8/2013 | Chmelar |
| 2013/0215954 A1 | 8/2013 | Beukema |
| 2013/0249719 A1 | 9/2013 | Ryan |
| 2013/0259113 A1 | 10/2013 | Kumar |
| 2013/0271194 A1 | 10/2013 | Pellerano |
| 2013/0307614 A1 | 11/2013 | Dai |
| 2013/0314142 A1 | 11/2013 | Tamura |
| 2013/0315501 A1 | 11/2013 | Atanassov |
| 2013/0346830 A1 | 12/2013 | Ordentlich |
| 2014/0112376 A1 | 4/2014 | Wang et al. |
| 2014/0159769 A1 | 6/2014 | Hong |
| 2014/0177645 A1 | 6/2014 | Cronie |
| 2014/0177696 A1 | 6/2014 | Hwang |
| 2014/0266440 A1 | 9/2014 | Itagaki |
| 2014/0269130 A1 | 9/2014 | Maeng |
| 2015/0049798 A1 | 2/2015 | Hossein |
| 2015/0070201 A1 | 3/2015 | Dedic |
| 2015/0078479 A1 | 3/2015 | Whitby-Strevens |
| 2015/0146771 A1 | 5/2015 | Walter |
| 2015/0220472 A1 | 8/2015 | Sengoku |
| 2015/0222458 A1 | 8/2015 | Hormati |
| 2015/0249559 A1 | 9/2015 | Shokrollahi |
| 2015/0333940 A1 | 11/2015 | Shokrollahi |
| 2015/0349835 A1 | 12/2015 | Fox |
| 2015/0380087 A1 | 12/2015 | Mittelholzer |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |
| 2016/0134267 A1 | 5/2016 | Adachi |
| 2016/0173219 A1* | 6/2016 | Shokrollahi ...... H04L 25/03343 370/208 |
| 2016/0197747 A1 | 7/2016 | Ulrich |
| 2016/0261435 A1 | 9/2016 | Musah |
| 2017/0310456 A1 | 10/2017 | Tajalli |
| 2017/0317449 A1 | 11/2017 | Shokrollahi |
| 2017/0317855 A1 | 11/2017 | Shokrollahi |
| 2018/0343011 A1 | 11/2018 | Tajalli et al. |

FOREIGN PATENT DOCUMENTS

| | | |
|---|---|---|
| JP | 2003163612 | 6/2003 |
| WO | 2005002162 | 1/2005 |
| WO | 2009084121 | 7/2009 |
| WO | 2010031824 | 3/2010 |
| WO | 2011119359 | 9/2011 |
| WO | 2018160603 A1 | 9/2018 |

OTHER PUBLICATIONS

Abbasfar, A., "Generalized Differential Vector Signaling", IEEE International Conference on Communications, ICC '09, (Jun. 14, 2009), pp. 1-5.

(56) References Cited

OTHER PUBLICATIONS

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.
Burr, "Spherical Codes for M-ARY Code Shift Keying", University of York, Apr. 2, 1989, pp. 67-72, United Kingdom.
Cheng, W., "Memory Bus Encoding for Low Power: A Tutorial", Quality Electronic Design, IEEE, International Symposium on Mar. 26-28, 2001, pp. 199-204, Piscataway, NJ.
Clayton, P., "Introduction to Electromagnetic Compatibility", Wiley-Interscience, 2006.
Counts, L., et al., "One-Chip Slide Rule Works with Logs, Antilogs for Real-Time Processing," Analog Devices Computational Products 6, Reprinted from Electronic Design, May 2, 1985, 7 pages.
Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.
Design Brief 208 Using the Anadigm Multiplier CAM, Copyright 2002 Anadigm, 6 pages.
Ericson, T., et al., "Spherical Codes Generated by Binary Partitions of Symmetric Pointsets", IEEE Transactions on Information Theory, vol. 41, No. 1, Jan. 1995, pp. 107-129.
Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.
Grahame, J., "Vintage Analog Computer Kits," posted on Aug. 25, 2006 in Classic Computing, 2 pages, http.//www.retrothing.com/2006/08/classic_analog_.html.
Healey, A., et al., "A Comparison of 25 Gbps NRZ & PAM-4 Modulation used in Legacy & Premium Backplane Channels", DesignCon 2012, 16 pages.
International Search Report and Written Opinion for PCT/EP2011/059279 dated Sep. 22, 2011.
International Search Report and Written Opinion for PCT/EP2011/074219 dated Jul. 4, 2012.
International Search Report and Written Opinion for PCT/EP2012/052767 dated May 11, 2012.
International Search Report and Written Opinion for PCT/US14/052986 dated Nov. 24, 2014.
International Search Report and Written Opinion from PCT/US2014/034220 dated Aug. 21, 2014.
International Search Report and Written Opinion of the International Searching Authority, dated Jul. 14, 2011 in International Patent Application S.N. PCT/EP2011/002170, 10 pages.
International Search Report and Written Opinion of the International Searching Authority, dated Nov. 5, 2012, in International Patent Application S.N. PCT/EP2012/052767, 7 pages.
International Search Report for PCT/US2014/053563, dated Nov. 11, 2014, 2 pages.
Jiang, A., et al., "Rank Modulation for Flash Memories", IEEE Transactions of Information Theory, Jun. 2006, vol. 55, No. 6, pp. 2659-2673.
Loh, M., et al., "A 3×9 Gb/s Shared, All-Digital CDR for High-Speed, High-Density I/O", Matthew Loh, IEEE Journal of Solid-State Circuits, Vo. 47, No. 3, Mar. 2012.
Notification of Transmittal of International Search Report and the Written Opinion of the International Searching Authority, for PCT/US2015/018363, dated Jun. 18, 2015, 13 pages.
Notification of Transmittal of the International Search Report and the Written Opinion of the International Searching Authority, or the Declaration for PCT/EP2013/002681, dated Feb. 25, 2014, 15 pages.
Notification of Transmittal of the International Search Report and the Written Opinion of the International Searching Authority, or the Declaration, dated Mar. 3, 2015, for PCT/US2014/066893, 9 pages.
Notification of Transmittal of the International Search Report and the Written Opinion of the International Searching Authority, or the Declaration, for PCT/US2014/015840, dated May 20, 2014. 11 pages.
Notification of Transmittal of the International Search Report and the Written Opinion of the International Searching Authority, or the Declaration, for PCT/US2014/043965, dated Oct. 22, 2014, 10 pages.
Notification of Transmittal of the International Search Report and the Written Opinion of the International Searching Authority, or the Declaration, for PCT/US2015/037466, dated Nov. 19, 2015.
Notification of Transmittal of the International Search Report and the Written Opinion of the International Searching Authority, or the Declaration, for PCT/US2015/039952, dated Sep. 23, 2015, 8 pages.
Notification of Transmittal of the International Search Report and the Written Opinion of the International Searching Authority, or the Declaration, for PCT/US2015/041161, dated Oct. 7, 2015, 8 pages.
Notification of Transmittal of the International Search Report and the Written Opinion of the International Searching Authority, or the Declaration, for PCT/US2015/043463, dated Oct. 16, 2015, 8 pages.
Oh, et al., Pseudo-Differential Vector Signaling for Noise Reduction in Single-Ended Signaling, DesignCon 2009.
Poulton, et al., "Multiwire Differential Signaling", UNC-CH Department of Computer Science Version 1.1, Aug. 6, 2003.
Schneider, J., et al., "ELEC301 Project: Building an Analog Computer," Dec. 19, 1999, 8 pages, http://www.clear.rice.edu/elec301/Projects99/anlgcomp/.
She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.
Skliar et al., A Method for the Analysis of Signals: the Square-Wave Method, Mar. 2008, Revista de Matematica: Teoria y Aplicationes, pp. 109-129.
Slepian, D., "Premutation Modulation", IEEE, vol. 52, No. 3, Mar. 1965, pp. 228-236.
Stan, M., et al., "Bus-Invert Coding for Low-Power I/O, IEEE Transactions on Very Large Scale Integration (VLSI) Systems", vol. 3, No. 1, Mar. 1995, pp. 49-58.
Tallini, L., et al., "Transmission Time Analysis for the Parallel Asynchronous Communication Scheme", IEEE Transactions on Computers, vol. 52, No. 5, May 2003, pp. 558-571.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
Wang et al., "Applying CDMA Technique to Network-on-Chip", IEEE Transactions on Very Large Scale Integration (VLSI) Systems, vol. 15, No. 10 (Oct. 1, 2007), pp. 1091-1100.
Zouhair Ben-Neticha et al, "The streTched-Golay and other codes for high-SNR fnite-delay quantization of the Gaussian source at ½ Bit per sample", IEEE Transactions on Communications, vol. 38, No. 12 Dec. 1, 1990, pp. 2089-2093, XP000203339, ISSN: 0090-6678, DOI: 10.1109/26.64647.
Notification of Transmittal of the International Search Report and the Written Opinion of the International Searching Authority, or the Declaration, dated Feb. 15, 2017, 10 pages.
Notification of Transmittal of the International Search Report and the Written Opinion of the International Searching Authority, or the Declaration., for PCT/US17/14997, dated Apr. 7, 2017.
Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.
Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.
Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.

(56) References Cited

OTHER PUBLICATIONS

Giovaneli, et al., "Space-frequency coded OFDM system for multi-wire power line communications", Power Line Communications and Its Applications, 20015 International Symposium on Vancouver, BC, Canada, Apr. 6-8, 2005, Piscataway, NJ, pp. 191-195.
International Search Report and Written Opinion for PCT/US2019/040756, dated Sep. 14, 2018, 1-8 (8 pages).

* cited by examiner

METHOD FOR MEASURING AND CORRECTING MULTI-WIRE SKEW

REFERENCES

The following prior applications are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I").

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. patent application Ser. No. 14/926,958, filed Oct. 29, 2015, naming Richard Simpson, Andrew Stewart, and Ali Hormati, entitled "Clock Data Alignment System for Vector Signaling Code Communications Link", hereinafter identified as [Simpson I].

U.S. patent application Ser. No. 14/717,717, filed May 20, 2015, naming Richard Simpson and Roger Ulrich, entitled "Control Loop Management and Differential Delay Detection and Correction for Vector Signaling Code Communications Links", hereinafter identified as [Simpson II].

U.S. patent application Ser. No. 14/253,584, filed Apr. 15, 2014, naming John Fox, Brian Holden, Ali Hormati, Peter Hunt, John D Keay, Amin Shokrollahi, Anant Singh, Andrew Kevin John Stewart, Giuseppe Surace, and Roger Ulrich, entitled "Methods and Systems for High Bandwidth Communications Interface" (hereinafter called "Fox I")

U.S. patent application Ser. No. 14/315,306, filed Jun. 25, 2014, naming Roger Ulrich, entitled "Multilevel Driver for High Speed Chip-to-Chip Communications" (hereinafter called "Ulrich I");

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences", hereinafter identified as [Ulrich II].

U.S. patent application Ser. No. 15/582,545, filed Apr. 28, 2017, 2014, naming Ali Hormati and Richard Simpson, entitled "Clock Data Recovery Utilizing Decision Feedback Equalization" (hereinafter called "Hormati I");

U.S. Provisional Patent Application No. 62/464,597, filed Feb. 28, 2017, naming Ali Hormati and Kiarash Gharibdoust, entitled "Method for Measuring and Correcting Multiwire Skew" (hereinafter called "Hormati II").

U.S. Provisional Patent Application No. 62/509,714, filed May 22, 2017, naming Armin Tajalli and Ali Hormati, entitled "Multi-modal Data-driven Clock Recovery Circuit" (hereinafter called "Tajalli I").

U.S. Pat. No. 9,100,232, issued Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi I].

FIELD OF THE INVENTION

The present embodiments relate to communications systems circuits generally, and more particularly to measurement and reduction of differential signal arrival times for a received communications signal transmitted over a high-speed multi-wire interface used for chip-to-chip communication.

BACKGROUND

In modern digital systems, digital information is processed in a reliable and efficient way. In this context, digital information is to be understood as information available in discrete, i.e., discontinuous values. Bits, collection of bits, but also numbers from a finite set can be used to represent digital information.

In most chip-to-chip, or device-to-device communication systems, communication takes place over a plurality of wires to increase the aggregate bandwidth. A single or pair of these wires may be referred to as a channel or link and multiple channels create a communication bus between the electronic components. At the physical circuitry level, in chip-to-chip communication systems, buses are typically made of electrical conductors in the package between chips and motherboards, on printed circuit boards ("PCBs") boards or in cables and connectors between PCBs. In high frequency applications, microstrip or stripline PCB traces may be used.

Common methods for transmitting signals over bus wires include single-ended and differential signaling methods. In applications requiring high speed communications, those methods can be further optimized in terms of power consumption and pin-efficiency, especially in high-speed communications. More recently, vector signaling methods have been proposed to further optimize the trade-offs between power consumption, pin efficiency and noise robustness of chip-to-chip communication systems. In those vector signaling systems, digital information at the transmitter is transformed into a different representation space in the form of a vector codeword that is chosen in order to optimize the power consumption, pin-efficiency and speed trade-offs based on the transmission channel properties and communication system design constraints. Herein, this process is referred to as "encoding". The encoded codeword is communicated as a group of signals, typically communicated essentially in parallel over multiple wires or communications channels, from the transmitter to one or more receivers. At a receiver, the received signals corresponding to the codeword are transformed back into the original digital information representation space. Herein, this process is referred to as "decoding".

Regardless of the encoding method used, the received signals presented to the receiving device are sampled (or their signal value otherwise recorded) at intervals best representing the original transmitted values, regardless of transmission channel delays, interference, and noise. The timing of this sampling or slicing operation is controlled by an associated Clock and Data Alignment (CDA) timing system, which determines the appropriate sample timing. Where the group of signals is communicated essentially in parallel over multiple wires or communications channels, variations in propagation delay over the multiple wires or channels can cause elements comprising one group of signals or codeword to be received at different times. This "skew" may, if uncorrected, prevent codewords from being received as coherent entities, and thus thwart decoding.

BRIEF DESCRIPTION

To reliably detect the data values transmitted over a communications system, a receiver accurately measures the received signal value amplitudes at carefully selected times. For vector signaling codes communicated essentially in parallel, this timing selection is comprised of two parts: accurate sampling of individual codeword elements received on individual wires or communications channels, and accurate interpretation of the entire received codeword, regardless of timing variations in reception of its component elements.

These differential propagation times across the vector signaling code codeword may be caused by variations in transmission path length or propagation velocity, and may be constant or vary over time. Identifying and correcting such differential arrival times or "skew" will increase the timing window for proper reception, thus improving received signal quality. Accurately measuring skew at the receiver is essential to subsequent skew correction, which as one example may be performed by introducing variable delays into the individual wire or symbol data paths prior to codeword decoding.

DETAILED DESCRIPTION

As described in [Cronie I], vector signaling codes may be used to produce extremely high bandwidth data communications links, such as between two integrated circuit devices in a system. Multiple data communications channels transmit symbols of the vector signaling code, acting together to communicate codewords of the vector signaling code. Depending on the particular vector signaling code used, the number of channels comprising a communications link may range from two to eight or more. Individual symbols, e.g. transmissions on any single communications channel, may utilize multiple signal levels, often three or more.

Embodiments may also apply to any communication or storage methods requiring coordination of multiple channels or elements of the channel to produce a coherent aggregate result.

Input Sampling Circuits

Conventional practice for a high-speed integrated circuit receiver includes terminating each data line (after any relevant front end processing such as amplification and frequency equalization) in a sampling device. This sampling device performs a measurement constrained in both time and amplitude dimensions; in one example embodiment, it may be comprised of a sample-and-hold circuit that constrains the time interval being measured, followed by a threshold detector or digital comparator that determines whether the signal within that interval falls above or below (or in some embodiments, within bounds set by) a reference value. In another embodiment, it may be comparable to an edge-triggered flip-flop, sampling the state of its input in response to a clock transition. Subsequently, this document will use the term sampling device, or more simply "sampler" to describe this receiver input measurement function as it implies both the time and amplitude measurement constraints, rather than the equivalent but less descriptive term "slicer" synonymously used in the art.

Figure 11:
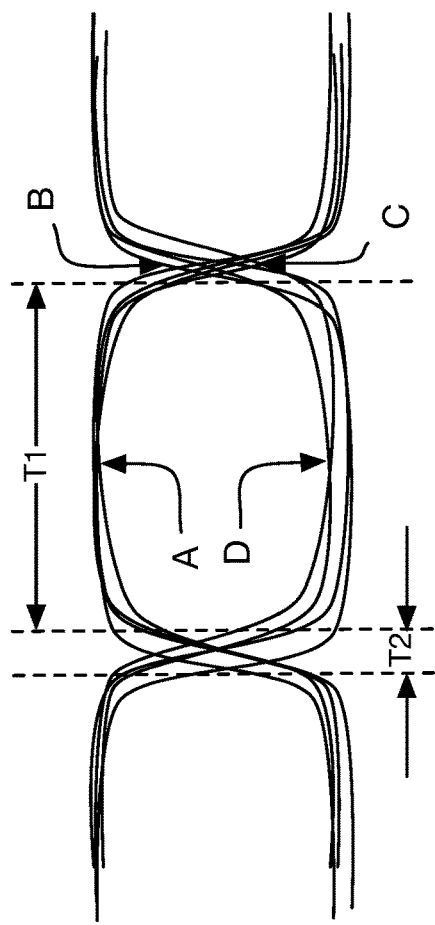
FIG. 11 is a diagram of a receiver eye plot illustrating center-of-the-eye sampling.

The receiver "eye plot" as illustrated in FIG. 11 graphically illustrates input signal values that will or will not provide accurate and reliable detected results from such measurement, and thus the allowable boundaries of the time and amplitude measurement windows imposed on the sampler.

A Clock Data Alignment or CDA circuit supports such sampling measurements by extracting timing information, either from the data lines themselves or from dedicated clock signal inputs, and utilize that extracted information to generate clock signals to control the time interval used by the data line sampling device(s). The actual clock extraction may be performed using well known circuits such as a Phase Locked Loop (PLL) or Delay Locked Loop (DLL), which in their operation may also generate higher frequency internal clocks, multiple clock phases, etc. in support of receiver operation. These sampling clocks are "aligned" with the data to be sampled to optimize the quality and accuracy of the sampled results, typically by configuring the CDA so that sampling occurs when the signal to be sampled is stable, the so-called "center of eye" timing intervals identified by A and D in FIG. 11.

System Environment

Figure 1:
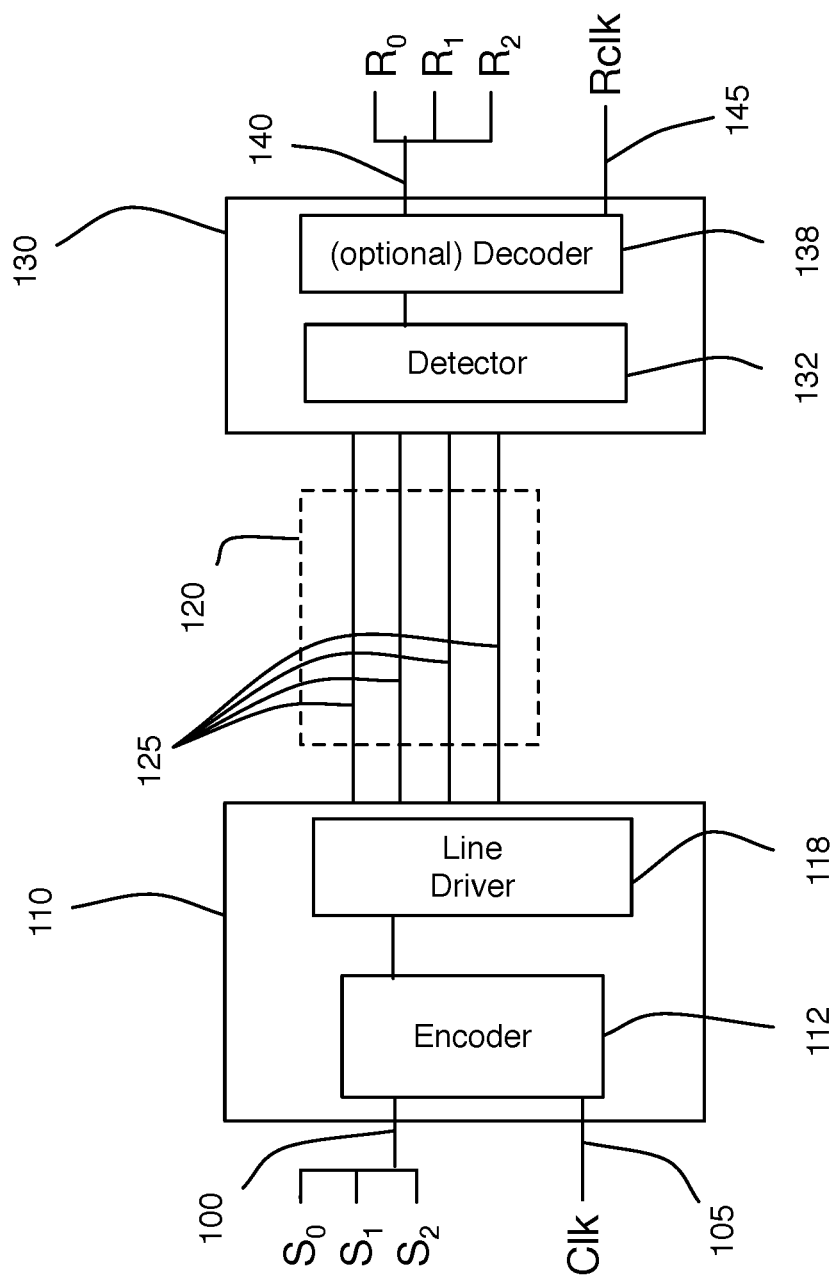
FIG. 1 shows a system with a transmitter 110 communicating over channel 120 comprising a multi-wire bus having multiple wires 125 to receiver 130.

FIG. 1 illustrates an exemplary system, in accordance with some embodiments. As shown, FIG. 1 includes a transmitter 110 that receives source data $S_0$-$S_2$ 100 and Clk 105, and an encoder 112 that encodes the information for transmission over a channel 120 including a multi-wire bus having multiple wires 125 via line driver 118. FIG. 1 further includes a receiver 130 including a detector 132 and in some embodiments includes a decoder 138, if needed, for producing receive data $R_0$-$R_2$ 140 and a receive clock Rclk 145.

For purposes of description and without implying limitation, the following examples assume a communications system environment comprising interconnection of one transmitting and one receiving integrated circuit device via four wires of essentially equal path length and transmission line characteristics, at a signaling rate of 25 Gigabit/second/wire, equivalent to a transmission unit interval of 40 picoseconds. The Hadamard 4×4 vector signaling code of [Cronie I], also called [Fox I] the Enhanced NRZ or ENRZ code, is used to communicate three data values (each carried by a sub-channel of the vector signaling code, as subsequently described) over four wires, with a receive clock derived from transitions of the received data values. Other embodiments may include interconnection of one transmitting and one receiving integrated circuit device via six wires of essentially equal path length and transmission line characteristics, at a signaling rate of 25 Gigabit/second/wire, equivalent to a transmission unit interval of 40 picoseconds. The Glasswing vector signaling code of [Shokrollahi I], also called the 5b6w, Chord NRZ or CNRZ code, is used to communicate five data values (each carried by a sub-channel of the vector signaling code, as subsequently described) over six wires, with a receive clock derived from transitions of the received data values.

It is assumed known methods for transmission pre-emphasis such as using Finite Impulse Response filtering, and receiver Continuous Time Linear Equalization (CTLE) and Decision Feedback Equalization (DFE) will be incorporated to provide adequate receiver signal quality.

Example communications channels may include skew, such as might be induced by variations in printed circuit board composition or wire routing, but for descriptive purposes the magnitude of this skew is assumed to be less than one unit interval. Embodiments correcting that amount of skew will in general address maximization of horizontal eye opening in a system in which the eyes are already partially open. Other embodiments may utilize the training sequences and methods described in [Hormati II] to achieve open eyes in a channel with larger amounts of skew, and further embodiments combining the described skew corrections with other known skew correction methods may be applied to environments with substantially greater amounts of skew, thus no limitation is implied.

Figure 2:
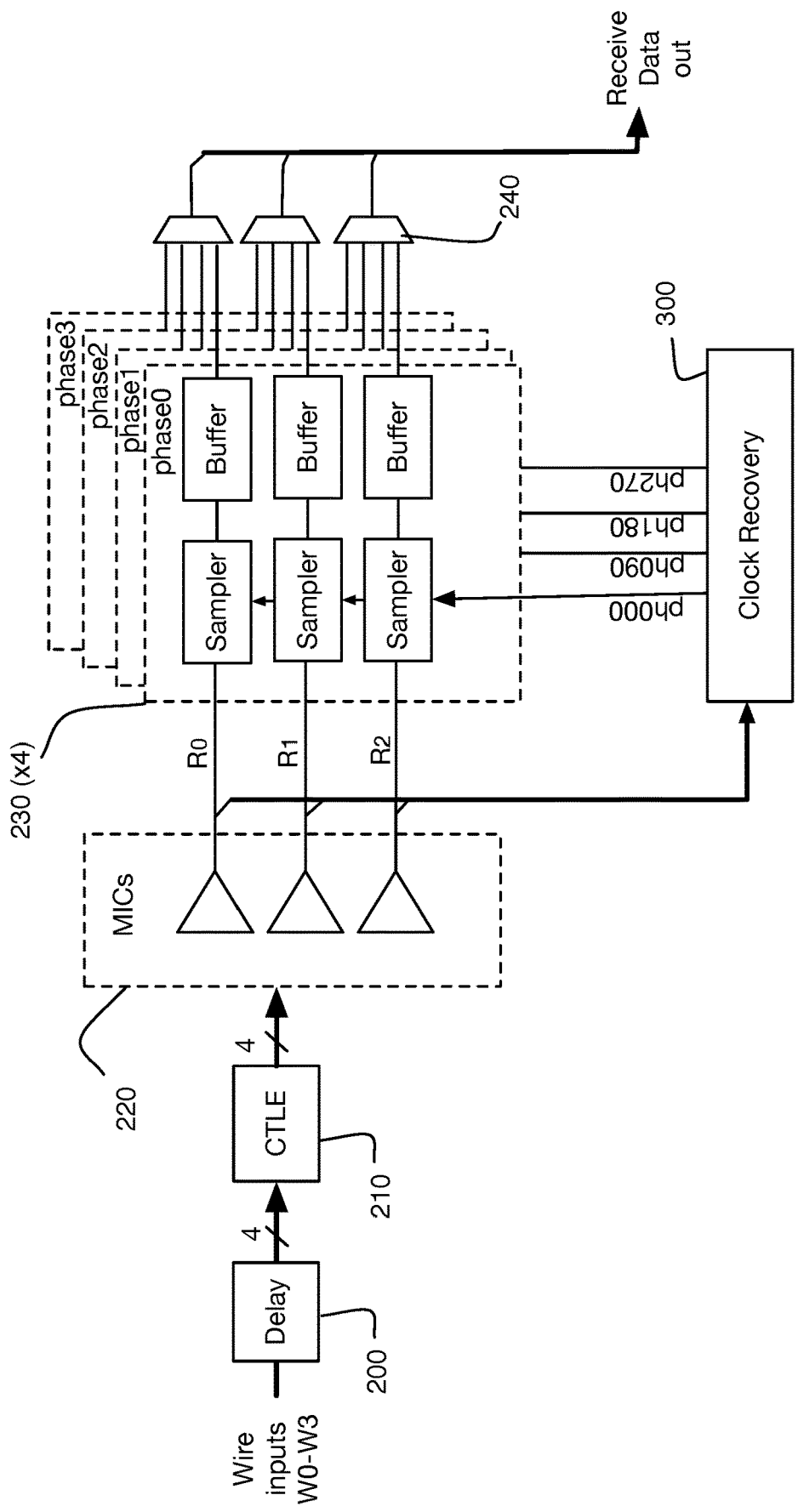
FIG. 2 illustrates one embodiment of a receiver for the ENRZ code utilizing receive clocks derived from received data transitions.

One example embodiment of a communications receiver for vector signaling code is shown in FIG. 2. In that block diagram, four data wire inputs W0 through W3 from the multi-wire bus are each processed by a delay element 200, the resulting signals then passed to Continuous Time Linear Equalizers (CTLE) 210 for optional amplification and/or frequency compensation. It is also common for CTLE circuits to be configured to provide additional high-frequency gain (also known as high frequency "peaking") to compensate for frequency-dependent transmission medium losses. The resulting processed wire signals are presented to Multi-input comparators (MICs) 220, which decode the sub-channels of the vector signaling code MIC0-MIC2. These sub-channel outputs are sampled via sampling circuits 230 at time intervals determined by Clock Recovery (CDA) subsystem 300, producing sub-channel 1-3 data outputs. As shown in FIG. 2, the receiver may operate in multiple phases and may include multiplexors 240 to sequentially output the sampled data for each phase. In an alternative embodiment, processing by delay element 200 occurs after CTLE 210 and before MIC 220.

Figure 6:
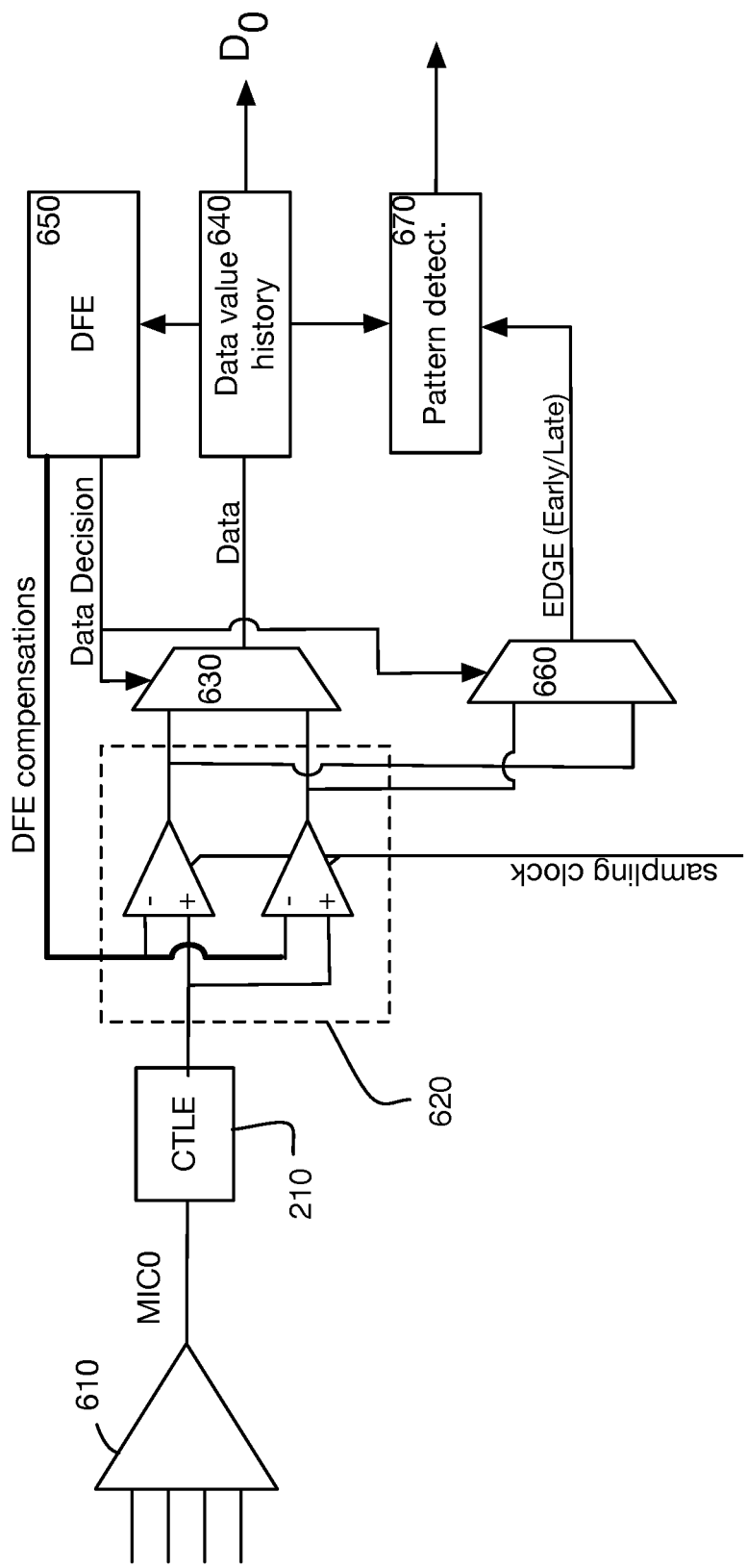
FIG. 6 is a block diagram of an exemplary sampler that may be used to provide data decisions and early/late indications, in accordance with some embodiments.

In some embodiments, additional samplers are provided for some or all sub-channel outputs, to facilitate timing analysis and/or management. As one example, such an additional sampler may be triggered using an earlier or later clock to detect signal transitions and thus optimize CDA operation. As another example, such an additional sampler may be configured with an adjustable offset slicer voltage, to facilitate measurement of vertical eye opening. The slicer offset voltages may additionally incorporate DFE correction factors to provide both data and clock edge information, as described in [Hormati I] and in FIG. 6. FIG. 6 includes at least one stage of speculative DFE 650 supported by two data samplers performing concurrent time-sampling operations at two different amplitude thresholds. As shown, the data samplers include comparators 620 generating comparator output slicing the signal received from CTLE 210 and sampling the comparator output according to the sampling clock. One comparator output is chosen as the data value D and the other is chosen as an error signal in the form of an early late indicator, according to the most recent data decision. This signal is referred to herein as a signal skew characteristic. Using data value history 640, a pattern detection block 670 may identify patterns having transitions, and responsively use the skew measurement signal (shown as an early/late indication E/L) to identify wires involved in the transition and to responsively increment or decrement a corresponding wire-specific counter. Such selections of the data signal and early/late skew measurement signal may be performed using multiplexors 630 and 660. [Tajalli I] additionally describes how clock edge information from two or more sub-channels may be combined, and how skew measurement information from sub-channels not experiencing a transition may be filtered from such combined results, providing improved timing feedback to the CDA subsystem.

Figure 7:
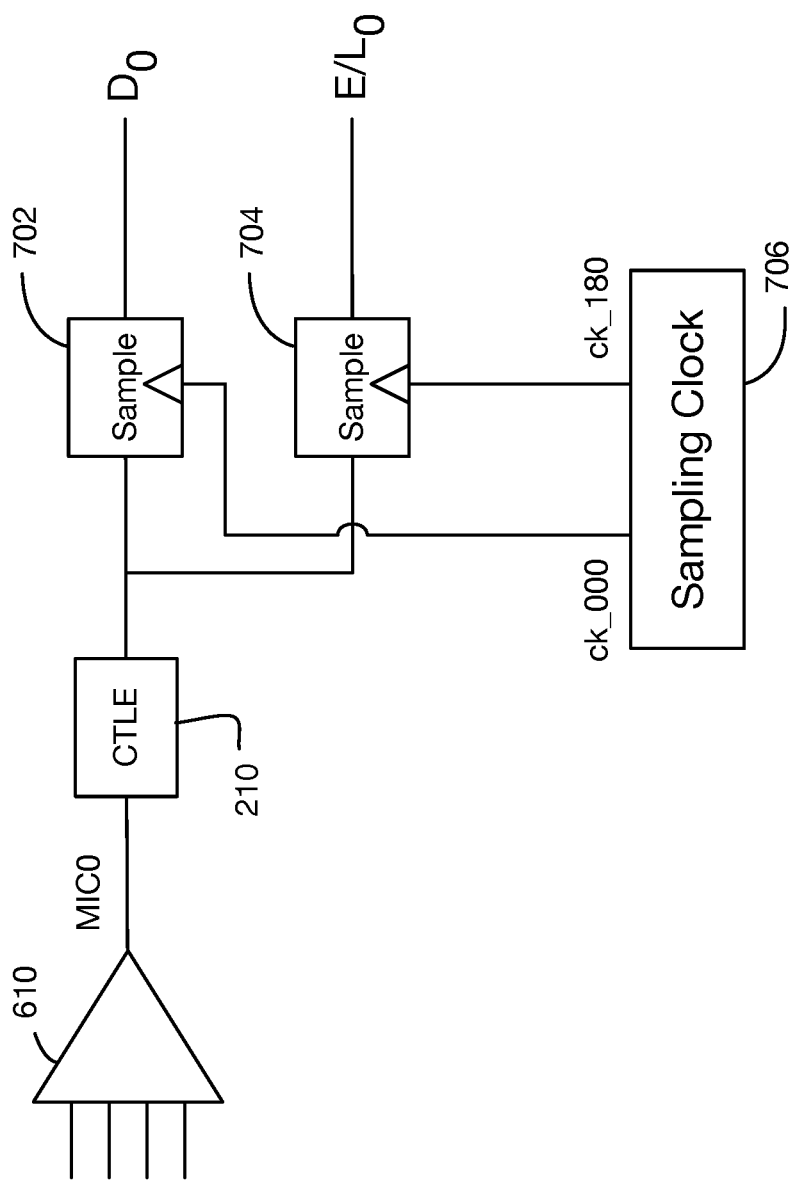
FIG. 7 is a block diagram of an alternative sampler that may be used to provide data decisions and early/late indications, in accordance with some embodiments.

FIG. 7 illustrates an alternative sampling mechanism that may be used in some embodiments. As shown, the output of MIC0 610 is processed by CTLE 210 as above, the output of which is sampled according to data sampler 702 and transition sampler 704. In such embodiments, the data signal from CTLE 210 may be sampled at a double rate. In at least one embodiment, the data may be sampled twice according to sampling clocks ck_000 and ck_180 provided by sampling clock block 706. In some embodiments, the 180 degree out-of-phase clocks may be used in which one clock samples "middle of the eye" (see FIG. 11), while the other is used to sample the transition regions to obtain an early/late indication as a skew measurement signal. Alternatively, a full rate clock may be used while data is transmitted twice, effectively halving the data rate. In such embodiments, only one sampler may be used, the output of which alternates between a data sample and an edge sample. In such embodiments, a full-rate data transmission may be initiated or resumed after the half-rate skew training period has been completed. Further measurements and adjustments made then be performed using the full-rate methods and circuits described herein.

Differential arrival times or "skew" of the various wire signals may delay or interfere with proper detection of the vector signaling code. This skew may be caused by variations in transmission path element length or propagation velocity, and may be constant or vary over time. Thus, accurately measuring skew at the receiver is helpful for subsequent skew correction, which as one example may be performed by introducing variable delays into the individual symbol data paths prior to codeword decoding. In another example, measured skew values may be conveyed back to the transmitter where wire-specific timing adjustments may be made to pre-compensate for skew as seen by the receiver.

Skew Adjustment and Compensation

Skew elimination includes incrementally offsetting individual wire signals in time to compensate for arrival time variations. Some methods for skew measurement, as one example, that of [Hormati II], also uses interactive adjustment of wire delays as part of their test and analysis procedure.

At the receiver, wire delay embodiments may incorporate known art methods in either the analog or digital domain utilizing variable delay elements, time adjustable sample-and-hold elements, adjustable FIFO buffers, etc.

Figure 5:
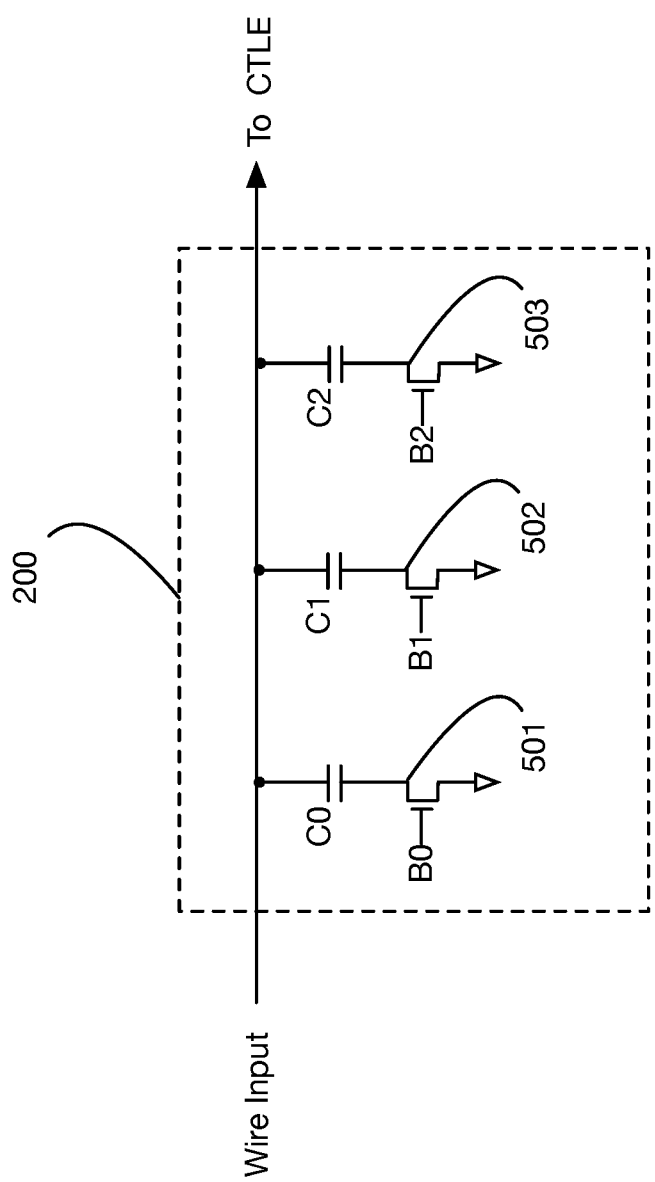
FIG. 5 shows one embodiment of an adjustable delay element for a wire of the multi-wire bus, as used in the receiver of FIG. 2.

[Hormati II] describes a low insertion loss Resistor/Capacitor filter inserted into each received wire signal, which is configurable for introducing small amounts of adjustable delay with minimal impact on signal amplitude. One such embodiment of a delay element 200 is shown in FIG. 5. Shown in the figure is a controllable delay circuit for a single wire, and each wire of the multi-wire bus may be configured with a similar circuit 200 to provide an adjustable amount of signal skew. Transistors 501, 502, and 503 may be enabled respectively by Skew control inputs $B_0$, $B_1$, $B_2$ to increase the Wire Input nodes's capacitance to ground by amounts determined by capacitors $C_0$, $C_1$, $C_2$. This added node capacitance, in association with the source and termination impedances of the incoming transmission line, introduces an increased delay into the wire signal. An alternative embodiment introduces the delay element 200 elsewhere in the wire signal path; as a non-limiting example, at the output of each CTLE stage rather than at the wire inputs of the receiver.

In one particular embodiment, $C_0$, $C_1$, $C_2$ values of 5 fF, 10 fF, 20 fF allows use of a binary skew control codeword that specifies binary increments of capacitance to be added, up to an additional aggregate capacitive value of 35 femto-Farads, corresponding to approximately 5 picoseconds of additional delay. In another embodiment, capacitors of equal value may be used, and the control word is implemented as a thermometer codeword rather than a binary codeword. As a side effect, the added capacitance also slightly degrades high frequency response, with the same embodiment experiencing 1.5 dB degradation in return loss (also generally known as $S_{11}$) at 12.5 GHz, when configured to introduce the maximum 5 psec delay.

Another embodiment capable of greater skew correction samples the wire signals using an analog track-and-hold or sample-and-hold circuit acting as Delay element 200, at skew-modified times during which the individual wire signals are stable, with sampling 140 of the resulting MIC sub-channel outputs using Sampling Clock being deferred by Clock Recovery system 150 until at least the latest of those skew-modified times. Some embodiments may utilize a series of such sampled delay elements per wire to provide increased delay time or reduced sampling signal artifacts.

Skew may also be eliminated by adjusting individual wire transmission times, as described by [Ulrich I]. Such an approach communicates information gathered by the receiver, e.g. relative receive times on the various wires, to the transmitter so that the transmitter may adjust its wire transmission times accordingly. In some embodiments, additional information is communicated permitting variations in communication wire mapping, including transpositions and order reversals, to be identified and corrected. This communication may be driven by the receiver, or may be distributed by a separate command/control processor, in either case communicating over a return data channel, out of band command/control channel, or other communication interface using known art protocols and methods outside the scope of this document.

Receiver Data Detection

As described in [Holden I], vector signaling codes may be efficiently detected by linearly combining sets of input signals using Multi-Input comparators or mixers (MIC). Three instances of such multi-input comparator circuits operating on permutations of the same four input signals are sufficient to detect all code words of ENRZ. That is, given a multi-input comparator that performs the operation $$R=(J+L)-(K+M) \quad \text{(Eqn. 1)}$$

where J, K, L, M are variables representing the four input signals values, then as one example and without limitation, the input permutations producing the three results $R_0$, $R_1$, $R_2$ based on the equations $$R_0=(W+Y)-(X+Z) \quad \text{(Eqn. 2)}$$

$$R_1=(Y+Z)-(W+X) \quad \text{(Eqn. 3)}$$

$$R_2=(Y+X)-(Z+W) \quad \text{(Eqn. 4)}$$

are sufficient to unambiguously identify each code word of the ENRZ code as represented by receive signal input values W, X, Y, Z. The results $R_0$, $R_1$, $R_2$ are commonly described as sub-channels of ENRZ, in this example each being modulated by one bit of data.

As taught by [Ulrich II], functionally equivalent MIC configurations may be obtained by refactoring Eqns. 1-4 so that they represent the summation of two differences.

Various methods and systems described herein obtain skew measurements, such as early/late indications, from an aggregate data signal that is formed from a linear combination of data signals on the wires of a multi-wire bus. The aggregate data signals are referred to herein as sub-channel data signals, and are formed using a type of multi-input comparator circuit, or MIC 220, 610. The MIC forms the linear combination by combining the input signals according to the decoder coefficients, or decoder weights, as specified by rows of an orthogonal matrix, such as a Hadamard matrix or other orthogonal matrix as described herein. Thus, each row of the orthogonal matrix defines the elements of the sub-channel codeword, which are then summed to obtain the orthogonal codeword, each element of the orthogonal codeword being a sum of the respective elements of the sub-channel codewords. Depending on the code being used (ENRZ, CNRZ, or another orthogonal code having a plurality of orthogonal sub-channels), all of the wires may be used for each sub-channel data signal (e.g., ENRZ), or the sub-channel data signals may be based on a subset of the wires. In some embodiments, all of the wires may be used for only some of the sub-channel data signals while other sub-channel data signals use a subset of the wires (e.g., CNRZ).

In each type of MIC used to decode a sub-channel by combining wire signals, any signal skew that is present on the wires of the particular sub-channel data signal under consideration will be present to one degree or another in the aggregate sub-channel data signal itself. The degree to which the wire-specific skew affects the given MIC sub-channel output depends on a number of factors, including at least the signal level transition occurring on the corresponding wire, and the relative magnitude that is applied to the signal on that wire (as specified by the sub-channel row of the matrix, and hence the MIC circuit structure). While the MIC is a voltage domain linear combiner, it acts as a phase interpolator when used to extract timing information. The measured skew of the sub-channel output of the MIC, often in the form of an "early/late" determination relative to the receive clock from the CDR subsystem, may then be converted to a skew measurement signal that is attributed to the wires involved in the transition and may even be apportioned among the wires according to each wire's relative contribution by taking into account the wire-specific level transitions as well as the corresponding sub-channel decoder coefficients of the MIC. Wire-specific skew offset values may then be generated by accumulating the results of a plurality of skew indicator signals. In some embodiments, the wire specific skew offset values may be generated by determined according to whether the accumulated skew measurement signals exceed a threshold, or the specific threshold that was exceeded in a given time period.

Because the measured skew is attributed to signal level variations on specific wires, and wire-specific MIC coefficients, either a training pattern with known signal level transitions on known wires may be sent, or the receiver may include a codeword detection circuit to identify what the signal level transitions would have been and the corresponding wires involved in the identified codeword transition(s). Pattern detection circuit 670 may be used to identify specific transitions and the wires involved in the corresponding identified transitions. Thus, the pattern detection circuit 670 may also identify the magnitude of the signal level transitions on the specific wires (according to the codes identified), and may accordingly adjust counter increment values to reflect the relative amount of skew contribution from the respective wires.

In some embodiments, a method comprises: generating, during a first and second signaling interval, an aggregated data signal by forming a linear combination of wire signals received in parallel from wires of a multi-wire bus, wherein at least some of the wire signals undergo a signal level transition during the first and second signaling interval; measuring a signal skew of the aggregated data signal; and, generating wire-specific skew offset values, each wire-specific skew offset value based on the signal skew measurement. That is, if the signal skew measurement is in the form of an early indication, then a counter for a wire involved in the transition may be decremented to decrease the wire-specific skew offset value, and if the signal skew measurement is a late indication, then the counter may be incremented. The final count value may be used as the wire-specific skew offset value(s), or the number of times the count value exceeded a threshold may be used as the wire-specific skew offset value(s). In some embodiments, these wire-specific skew offset values may be used directly as a delay adjustment control signal by adjusting a capacitive loading of the corresponding wire at the receiver. In other embodiments, the values may be sent across a reverse channel to the transmitter, thereby allowing the transmitter to pre-compensate for the skew. In some embodiments, skew offset values may be sent to the transmitter only after a receiver's ability to correct for skew has been reached. That is, once a capacitive loading or other delay mechanism at the receiver has been exhausted, the receiver may communicate a specific wire skew correction to the transmitter. The receiver may then compensate to the adjusted signal from the transmitter, thereby bringing the wire skew back within the range which the receiver may compensate for. The receiver may send specific values of wire-specific skew control signals, or may simply send wire-specific up and down indicators indicating an incremental correction.

In a general characterization of the skew observed from forming linear combinations of wire signals of the wired-line multi-wire bus systems with m MICs, $MIC_i$, $i=0, \ldots, m-1$, each MIC can be described by:

$$MICi = \{a_{ij}, r_i\}, j=0, \ldots, n-1 \qquad \text{(Eqn. 5)}$$

where n is the number of wires. Here, $a_{ij}$ are the corresponding decoder coefficients, and $r_i$ is the comparison reference level (often set to zero for simplicity). This description can be rewritten as:

$$VMICi = \sum_{j=0}^{n-1} a_{ij} w_j - r_j \qquad \text{(Eqn. 6)}$$

where VMIC stands for the voltage domain operation of a MIC forming a linear combination of inputs. Here, $a_{i,j}$ are real numbers representing MIC coefficients, and $w_j$ are real values corresponding to the instantaneous signal value on each wire. Now if the input wires each have a specific skew, $\Delta t_{w(j)}$, with respect to an arbitrary reference time, then the skew of the signal s(i) at the output of MICi can be estimated by:

$$\Delta t_{s(i)} = \frac{\sum_{j=0}^{n-1} a_{ij} \Delta w_j \Delta t_{w(j)}}{\sum_{j=0}^{n-1} |a_{ij} \Delta w_j|} \qquad \text{(Eqn. 7)}$$

where the signal level transition of wire j is given by $\Delta w_j = w_j[\text{now}] - w_j[\text{old}]$, and wherein in some embodiments $-1 \leq \Delta w_j \leq +1$ indicates the normalized magnitude of the transition experienced by signals $w_j$ on wire j ($w_j=0$ if there is no transition). The voltage swing may be normalized according to the maximum value. As can be seen, the skew at the output of a MIC depends on the data pattern. Hence, it can potentially change between $\max(t_j)$ and $\min(t_j)$, depending on the input data pattern. The data dependent skew at the output of each sub-channel means that even in an ideal system without any ISI, the eye will be closed by $\max(t_j) - \min(t_j)$, due to skew. Skew dependent eye closure does not occur in MICs described by a linear encoding/decoding scheme, such as NRZ, or ENRZ. In some coding schemes such as in CNRZ, skew can close the eye at the output of MIC due to its sensitivity to deterministic or random CM noise.

Here it is assumed that $|t_j| \ll T$ (T is the data period or signaling interval, corresponding to 1×UI). Close to the transition time, the signal value on each wire at time $t \ll T$ can be approximated by:

$$w_j = bj(t+tj) \qquad \text{(Eqn. 8)}$$

From (Eqn. 8) and (Eqn. 6), the transition time at the output of sub-channel can be approximated by (Eqn. 7).

Indeed, (Eqn. 7) implies that each MIC is operating as a phase interpolator in the time domain. In other words, the transition time at the output of a MIC stage is a weighted interpolation of the transition times of the input signals. Hence, if a multi-wire receiver can be described with $[a_{ij}, r_i]$, then the cross times at the output of MIC can be described by $[a_{ij} \ b_{ij}]$. If this matrix is invertible, then one can precisely estimate the skew at the input of receiver. Otherwise, if $[a_{ij} \ b_{ij}]$ is not invertible, then it is not possible to calculate the input skew values and an alternative algorithm may be used to make the estimation.

In some embodiments using a GW code, some transmitter implementations exhibit a skew pattern $T=[0, 0, t_1, t_1, t_2, t_2]$, corresponding to wires $W=[w0, \ldots, w5]$. This skew pattern is due to floor-plan of the transmitter. Using Eqn. 7, it can be shown that the expected skew at the output of receiver sub-channels is:

$$T_{subch} = [(t_1+t_2)/3, t_1/2, 0, t_1/2+t_2/2, t_2]. \qquad \text{(Eqn. 9)}$$

Based on this calculation, the output of sub-channel five has the maximum skew, while the transition at the output of sub-channel two occurs as the earliest. The experimental data matches very well with the estimation made in Eqn. 9. Hence, Eqn. 9 can be used to estimate the skew between wires ($t_1$ and $t_2$).

In one embodiment, an algorithm to compensate for skew in a system using the GW code may include:

(1) measuring the phase interpolator code (or an alternative signal that can be used to measure the skew between sub-channels) that identifies the crossing point of sub-channel, based on eye of sub-channel (4) (which involves only wires 4 and 5);
(2) make a similar measurement for other sub-channels;
(3) use eq. (9) to estimate the skew corresponding to each wire.

In some embodiments, the measurement algorithm includes measuring the zero crossing points at the output of each Rx sub-channel. The receiver in Rx includes five sub-channels (five MICs). The output of each MIC is sampled by four slicers corresponding to the quarter rate architecture of the receiver (i.e., each slicer operates at one quarter rate, taking turns in processing the full rate aggregate data signal of a given MIC). The procedure of measurement of some embodiments is as follows:
(1) Produce a periodic (e.g., 16 UI data, 8 UI high and 8 UI low) on one of the phases of the transmitter (this assumes a transmitter having multiple phases also).
(2) Measure cross point at the output of the 5 MICs, each one observed by 4 slicers. This gives 20 independent measurements.
(3) Go back to step (1) and transmit a new set of periodic data on a different phase of the transmitter. Repeat this flow until data is collected for all the four phases of the transmitter.

Suppose M0 is measurements that have been carried out corresponding to sub-channel 0. Here, a periodic data sequence has been sent on the transmitter and measured by the receiver slicers. The cross point of the received signal at the output of Rx MICs can be measured. This is done by rotating the sampling clock using a phase interpolator of the four slicers that are connected to each MIC.

$$M0 = \begin{bmatrix} x0+y0+z0 & x1+y0+z1 & x2+y0+z2 & x3+y0+z3 \\ x0+y1+z3 & x1+y1+z2 & x2+y1+z3 & x3+y1+z0 \\ x0+y2+z2 & x1+y2+z3 & x2+y2+z0 & x3+y2+z1 \\ x0+y3+z1 & x1+y3+z0 & x2+y3+z1 & x3+y3+z2 \end{bmatrix}$$

The columns are measurements that have been done for different phases of the receive clock. For example, the column 0 shows four independent measurements coming out from the slicer of sub-channel zero, which is controlled with phase 000 (0-degree) receive clock. The rows however, refer to four different sets of data that have been transmitted from the transmitter. The row 0, for example, is the periodic data that has been produced by Tx phase 000.

Meanwhile, here:
x: refers to error or skew on Rx sampling clock
y: refers to the error or the skew on the Tx clock that produces the output signal. For example, y0 refers to the timing error on the Tx clock phase 000.
z: is referring to the non-linearity effect coming from PI (phase interpolator).

As can be seen, the 16 measurements done at the output of MIC corresponding to sub-channel 0, may be used to calculate (or estimate) 12 independent parameters.

Considering all sub-channels, there will be five sets of measurements for the five MICs, each including 16 measurements, producing 80 individual measurements. Comparing measurements M0, M1, M2, and M3 helps to measure wire to wire skew. In some embodiments, a maximum likelihood approach may be used to extract the following items:

(a) Five inter-wire skew numbers
(b) Inter-phase clock skew numbers for Rx
(c) Inter-phase clock skew numbers for Tx
(d) Four numbers describing nonlinearity of the phase interpolator. Note that the non-linearity numbers for PI can be measured in only few data points.

ENRZ Coding: In some embodiments of an ENRZ scheme, $|a_{ij}|=0.25$, for all i and j values. In some embodiments, the circuit is configured to select specific patterns in order to make measurements for wire skew. Additional embodiments using subsets of transitions in an ENRZ transceiver will be described.

Relationship Between Wires and Codes in ENRZ

As discussed above, and in view of the detection equations Eqns. 2-4, there are difficulties inherent in performing measurements of received sub-channel signals and attempting to map that information back to variations in the received wire signals. Each sub-channel is dependent on all four received wire signals, thus there is no obvious mathematical process to partition, factor out, or otherwise determine information about individual wire signals.

TABLE I

| Code | Wire0 | Wire1 | Wire2 | Wire3 | $R_0$ | $R_1$ | $R_2$ |
|------|-------|-------|-------|-------|-------|-------|-------|
| 7 | +1 | −1/3 | −1/3 | −1/3 | 1 | 1 | 1 |
| 1 | −1/3 | +1 | −1/3 | −1/3 | 0 | 0 | 1 |
| 2 | −1/3 | −1/3 | +1 | −1/3 | 0 | 1 | 0 |
| 4 | −1/3 | −1/3 | −1/3 | +1 | 1 | 0 | 0 |
| 0 | −1 | +1/3 | +1/3 | +1/3 | 0 | 0 | 0 |
| 6 | +1/3 | −1 | +1/3 | +1/3 | 1 | 1 | 0 |
| 5 | +1/3 | +1/3 | −1 | +1/3 | 1 | 0 | 0 |
| 3 | +1/3 | +1/3 | +1/3 | −1 | 0 | 1 | 1 |

As shown in Table I, the wire signals used to encode codes 7, 1, 2, 4 utilize a single "+1" signal value and three "−⅓" signal values. (As ENRZ is a balanced vector signaling code, all signal values in a given codeword sum to zero.) Similarly, the wire signals used to encode codes 0, 6, 5, 3 utilize a single "−1" signal and three "+⅓" signals. More significantly, transitions between any of codes 7, 1, 2, 4 or between codes 0, 6, 5, 3 only change the signals on two wires. Thus, if any of, for example, codes 7, 1, 2, 4 is received followed by a different code from that same set, the transition between codes is associated with exactly two wires changing, and which two wires changed may be determined using the information in Table I. Identical conditions apply to consecutive occurrences of codes drawn from the set 0, 6, 5, 3.

These known two-wire transitions are associated with exactly two values changing in the received data "word" $R_0$, $R_1$, $R_2$. Such criterion is not by itself sufficient to identifying which two wires changed, however, as for example a transition between code 7 and code 1 due to changes in Wire® and Wire1 cause only $R_0$, $R_1$ to change, but so do transitions between codes 0 and 6; Contrariwise, changes of only $R_0$, $R_1$ may also be caused by transitions between codes 2 and 4, or between codes 3 and 5, due to changes in Wire2 and Wire3. Thus, an algorithm or circuit may be used to identify wire pairs associated with sub-channel transitions may identify particular sequential sets of codes. The particular wire order and codeword values used in this example were chosen for descriptive convenience, and in no way imply limitation.

Determining Transition Times

As previously mentioned, the system environment for these descriptions utilizes receiver clock recovery derived from transitions of the detected sub-channel data. To maximize the amount of information available to maintain proper clock alignment, it is common to monitor all received sub-channels. [Tajalli I] describes such a clock recovery system, in which individual phase detectors sensitive to transitions in each sub-channel produce phase error results, which are then summed to produce an aggregate error signal used to update the clock PLL phase. In one such embodiment, only results from sub-channels with valid transitions within the time interval of interest are summed; in an alternative embodiment, simple "bang/bang" phase comparators are used and summed without such filtration, with any anomalous error results produced by non-transitioning sub-channels being averaged out over time. Known art embodiments utilizing either baud-rate clock edge detection methods or double-rate clock edge sampling methods may also be used.

Figure 3:
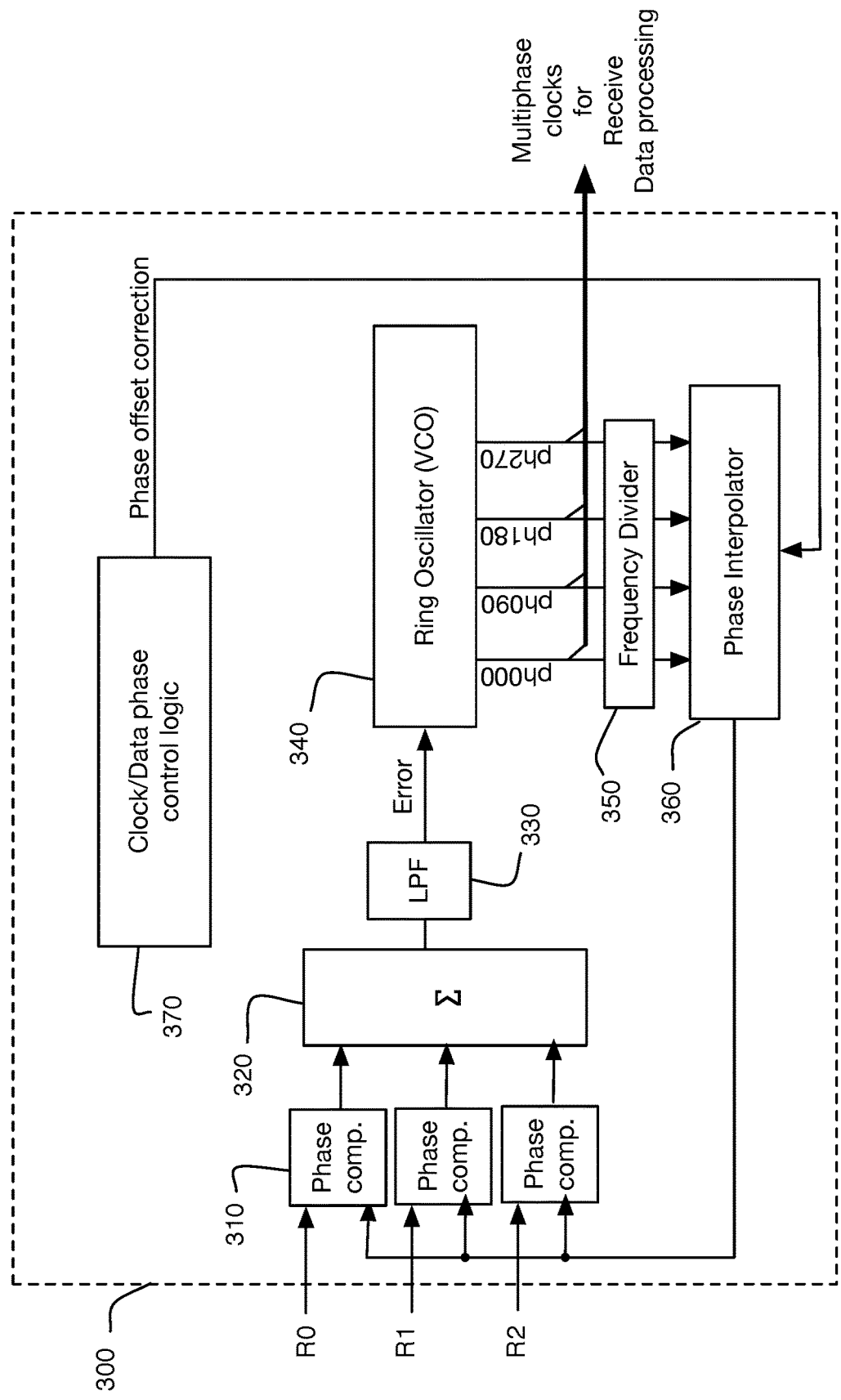
FIG. 3 illustrates one embodiment of a Clock Recovery subsystem as used in the receiver of FIG. 2.

FIG. 3 illustrates a clock recovery circuit 300, for use in some embodiments. As shown, FIG. 3 includes multiple partial phase comparators 310, reach receiving a respective sub-channel output. In such embodiments, each partial phase comparator only outputs a partial phase-error result if a transition has occurred on the respective sub-channel. A summation circuit 320 receives each partial phase error signal and generates a composite phase error signal that is filtered by the loop filter 330 (which may be a low-pass filter (LPF) to provide a low-frequency error signal) to the voltage controlled oscillator (VCO) 340. The clock recovery circuit 300 may further include a frequency divider 350 that receives the outputs of the VCO 340, divides the frequency down, and provides the signals to the phase interpolator 360, which provides interpolated signals to the phase comparators 310. As shown, the phase interpolator also receives a phase offset correction signal from clock/data phase control logic 370. Such a correction signal may account for process variations in the system. The outputs of the VCO 340 may be used as sampling clocks in a multi-phase system, one phase being shown in FIG. 4.

In the two-wire transitions of interest, two sub-channel results change, essentially simultaneously except for random circuit variations. Thus, two essentially identical phase error results are incorporated into the aggregate error signal during such transitions. The following algorithm captures the overall "early or late" status of the aggregate error signal, for use in correcting wire skew.

Skew Correction Algorithm

Inputs to this algorithm include the received data, i.e. the detected sub-channel results $R_0$, $R_1$, $R_2$. For purposes of explanation, they are described herein as identifying "codes", i.e. particular wire and result combinations, as previously described relative to Table I. Information from at least two consecutively received unit intervals is obtained, here called code(N) and code(N+1), along with the detected or measured skew in the form of a clock phase error associated with that time interval, which may be a signed magnitude indicating the amount that the received transitions were earlier or later than the expected clock time, or as little as a simple binary sign indicating "early/late".

The information may be obtained by continuous observation of the received data stream (as one example, using a finite state machine,) or may be obtained by statistically valid sampling of the data stream (as one example, by a software process running on a control or management processor periodically requesting and receiving sequences of received data, such samples spanning at minimum two consecutively received unit intervals and the associated clock phase error information.

Outputs from this algorithm are running estimates of the relative arrival times of signals on the four wires, which may be used to immediately or periodically adjust wire signal delay elements, or request or indicate comparable per-wire timing adjustments be made by the transmitter. In one embodiment, said running estimates are immediately used to adjust receiver wire delays. In another embodiment, running estimates are maintained as variables in memory, with adjustments initiated when the absolute positive or negative magnitude of the variable exceeds a predetermined threshold, thus filtering out small perturbations.

Another embodiment of the algorithm in Verilog is provided as Appendix I.

```
Static signed integar Wire0, Wire1, Wire2, Wire3
Calculate_skew( Data(N), Data(N+1), signed integer Error)
{
if Data(N) == 7 && Data(N+1) == 1 || Data(N) == 1 && Data(N+1) == 7
    Wire0 += Error
    Wire1 += Error
    break;
else if Data(N) == 0 && Data(N+1) == 6 || Data(N) == 6 && Data(N+1) == 0
    Wire0 += Error
    Wire1 += Error
    break;
else if Data(N) == 7 && Data(N+1) == 2 || Data(N) == 2 && Data(N+1) == 7
    Wire0 += Error
    Wire2 += Error
    break;
else if Data(N) == 0 && Data(N+1) == 5 || Data(N) == 5 && Data(N+1) == 0
    Wire0 += Error
    Wire2 += Error
    break;
else if Data(N) == 2 && Data(N+1) == 4 || Data(N) == 4 && Data(N+1) == 2
    Wire2 += Error
    Wire3 += Error
    break;
else if Data(N) == 5 && Data(N+1) == 3 || Data(N) == 3 && Data(N+1) == 5
    Wire2 += Error
    Wire3 += Error
    break;
else if Data(N) == 1 && Data(N+1) == 4 || Data(N) == 4 && Data(N+1) == 1
    Wire1 += Error
    Wire3 += Error
    break;
```

```
else if Data(N) == 6 && Data(N+1) == 3 || Data(N) == 3 && Data(N+1) == 6
    Wire1 += Error
    Wire3 += Error
    break;
else if Data(N) == 1 && Data(N+1) == 2 || Data(N) == 2 && Data(N+1) == 1
    Wire1 += Error
    Wire2 += Error
    break;
else if Data(N) == 6 && Data(N+1) == 5 || Data(N) == 5 && Data(N+1) == 6
    Wire1 += Error
    Wire2 += Error
    break;
else if Data(N) == 7 && Data(N+1) == 4 || Data(N) == 4 && Data(N+1) == 7
    Wire0 += Error
    Wire3 += Error
    break;
else if Data(N) == 0 && Data(N+1) == 3 || Data(N) == 3 && Data(N+1) == 0
    Wire0 += Error
    Wire3 += Error
    break;
}
```

Figure 12:
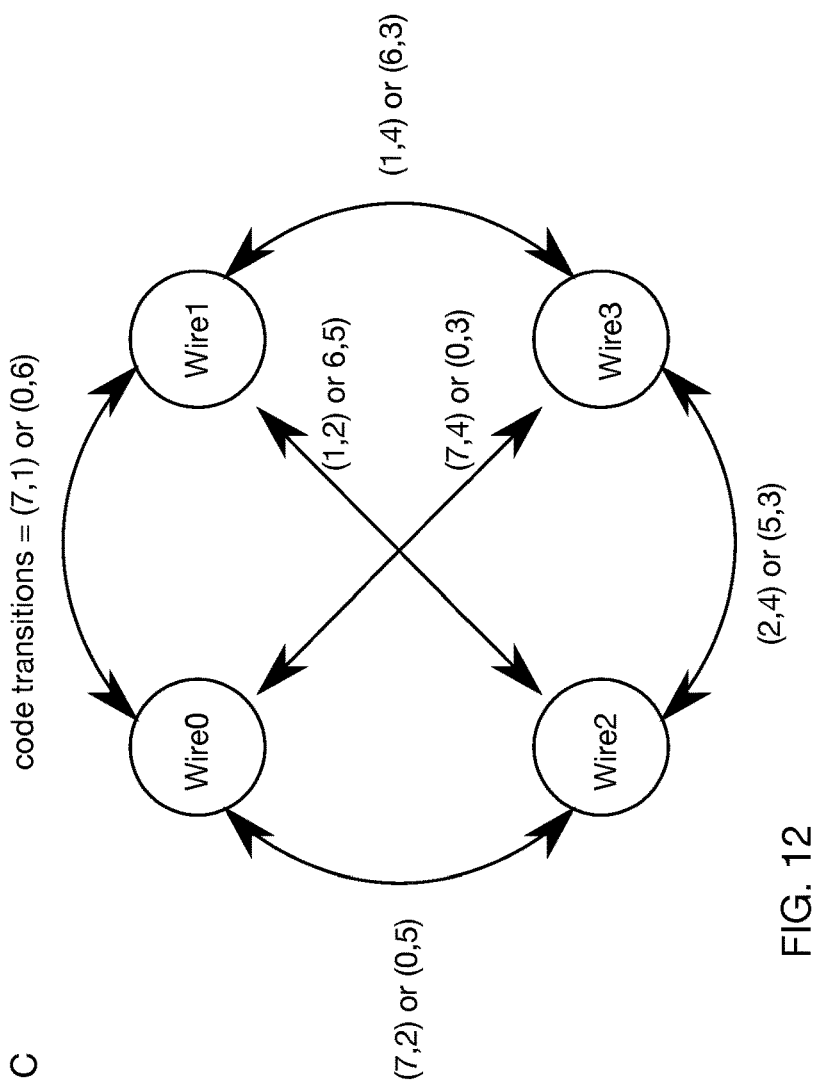
FIG. 12 is a state diagram associating particular code transitions with wire transitions.

The 'if' statements correspond exactly to the transition conditions shown in the state diagram of FIG. 12, where consecutive codes of 7 followed by 1, or of 1 followed by 7 are associated with wire0 and wire1, as are code transitions between 0 and 6.

As there is no way of determining which of the two transitioning wires is the source of the early or late timing, the variables representing skew offset metrics for both wires are updated equally. If, for example, subsequent transitions associated with codes 0 and 5 also update wire0 and wire2 in the same direction, it is likely that wire0, common to both measurements, is the source of the timing error. Thus, the algorithm may be run over a number of different samples to provide a reasonable estimate of individual wire timing errors. As previously mentioned, at least one embodiment introduces an absolute magnitude threshold before accumulated timing error values cause actual timing modifications, so as to reduce random timing adjustments associated with these measurement artifacts. Other embodiments adjust wire timings immediately, presuming that small adjustments even in the wrong direction will introduce minimal error, while continued adjustments in the same direction will eventually produce an optimized eye opening.

Figure 4:
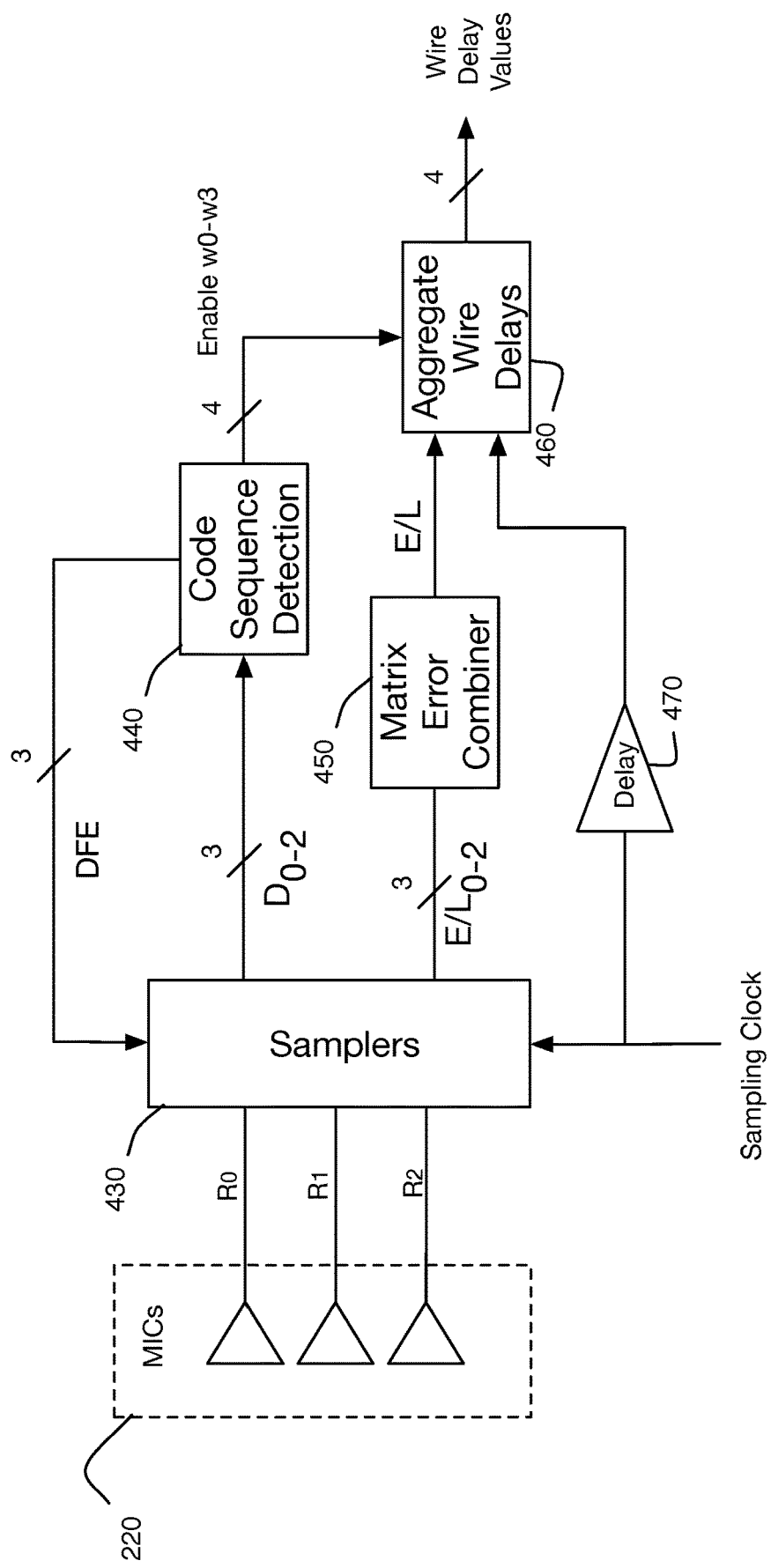
FIG. 4 is a block diagram of a skew detection system, in accordance with some embodiments.

FIG. 4 is a block diagram of a receiver configurable for performing the skew detection algorithm described above. As shown, FIG. 4 includes MICs 220 as described above for receiving the signals on the wires and responsively generating aggregated data signals representing the sub-channel outputs $R_0$-$R_2$. The sub-channel outputs are sampled 430, the samplers configured to provide data outputs $D_{0-2}$ for each sub-channel, as well as early/late indication signals $E/L_{0-2}$ for each sub-channel. In some embodiments, samplers 430 may take the form of the samplers shown in FIG. 6 or FIG. 7 as described above. FIG. 4 includes a code sequence detection block 440 for detecting valid sets of sequentially received bits (each set representing a code 0 through 7 as described above). Such sequences are illustrated in the state diagram of FIG. 12. In some embodiments, DFE may be provided by the code sequence detection block 440, which may be used by the samplers 430 in embodiments using e.g., the samplers shown in FIG. 6.

Figure 8:
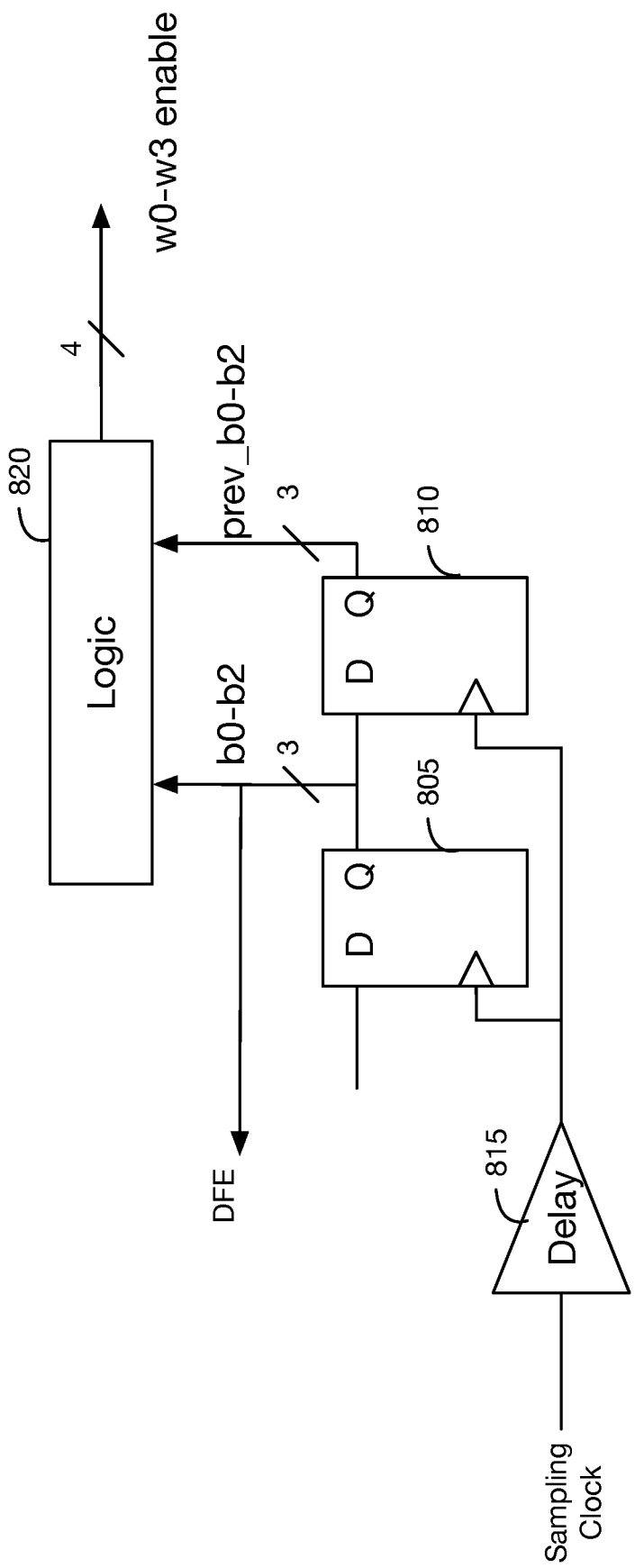
FIG. 8 is a block diagram of a code sequence detection circuit, in accordance with some embodiments.

FIG. 8 illustrates a block diagram of a code sequence detection block, in accordance with some embodiments. In some embodiments, the code sequence detection block may be implemented through the use of D flip flops 805 and 810 being sampled by a delayed 815 version of the sampling clock to allow time for buffering. Current detected bits b0-b2 and previously detected bits prev_b0-b2 are analyzed by a logic circuit 820 to see if a valid code sequence is detected. If a valid code sequence is detected, wire delay adjustment enable signals w0-w3 enable are provided to the aggregate wire delay block 460 shown in FIG. 4. As described above, in the embodiment of the H4 code, two wires are involved in any valid code sequence detected by logic circuit 820. In such embodiments, only two of the wire delay adjustment enable signals w0-w3 enable will be '1s', while the other two are '0' (thus not updating delay values in aggregate wire delay block 460).

In alternative embodiments, other sequences may be used, in addition to or instead of the ones involving only two wires. For example, the code sequence detection circuit 670 may identify transitions where each wire changes sign, but maintains the same magnitude, such as the codeword [−1, ⅓, ⅓, ⅓] changes to [1, −⅓, −⅓, −⅓] or [−⅓, 1, −⅓, −⅓] changes to [⅓, −1, ⅓, ⅓], and so on. This set of transitions includes 8 sets of codeword sequences. In these transitions, the magnitudes of the wire-specific transitions are considered and the skew metrics are updated accordingly. In particular, skew observed or measured at the MIC output for a codeword change from [−1, ⅓, ⅓, ⅓] to [1, −⅓, −⅓, −⅓] may be weighted according to the transition magnitudes given by: abs((wire(code1, i)−wire(code2, i)*mic(wire(i)), or in this case, [2, ⅔, ⅔, ⅔]. That is, skew on wire W0 will have 3 times the impact on observed MIC output skew relative to skew on any other wire. The counter increments may be adjusted according to the identified transition magnitudes to properly reflect the relative contribution of skew from each of the wires.

Figure 9:
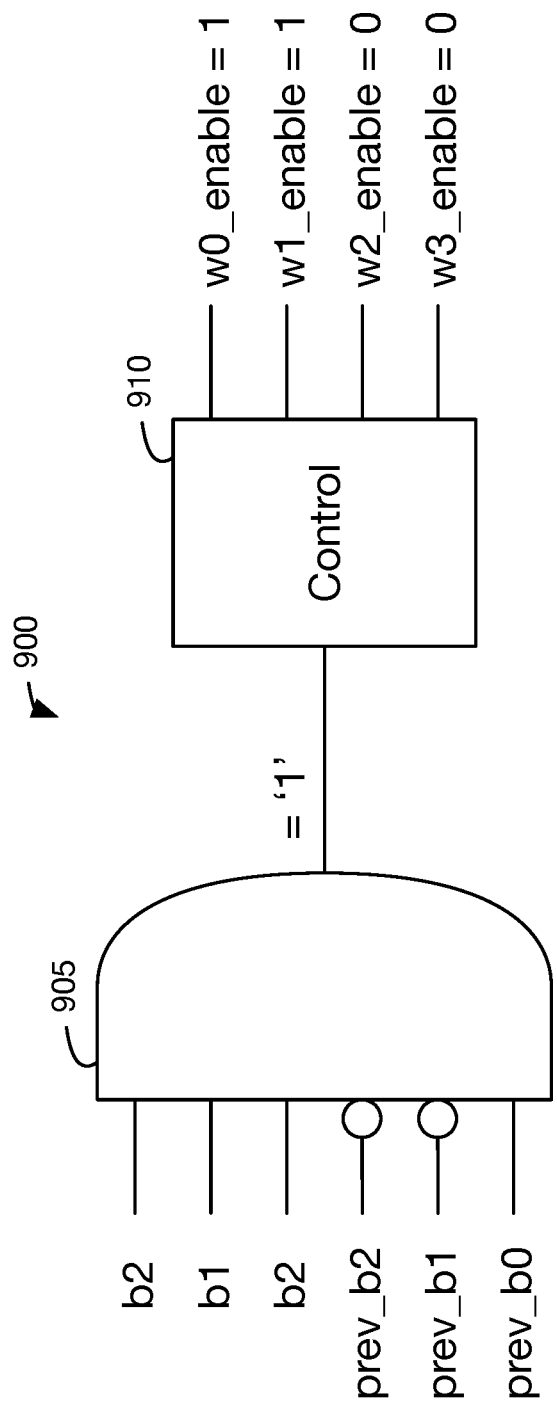
FIG. 9 is a block diagram of a logic circuit for generating wire delay adjustment enable signals, in accordance with some embodiments

FIG. 9 illustrates a block diagram 900 of a logic circuit 820, in accordance with some embodiments. The example of FIG. 9 illustrates the valid code sequence from code '1' in Table I to code '7'. Such a logic circuit may be implemented as an AND gate 905, in which the output of gate 905 is high if bits b0-b2 corresponding to code '1'='001' and if previously received bits prev_b0-b2 corresponding to code '7'='111'. A control circuit 910 may analyze the outputs of all such detection gates, and may output wire delay adjustment enable signals w0-w3_enable to the aggregate wire delay block 460. The enable signals indicate which counters should be adjusted (incremented or decremented according to the signal skew characteristic). In addition, the count increment may also be weighted as described herein according to the relative magnitudes of the wire signal level transitions. In some embodiments, the control circuit 910 may implement control logic that implements Table II below:

TABLE II

| Previous Bits | | | Current Bits | | | Wire Delay Adjustment Enable Signals |
|---|---|---|---|---|---|---|
| 1 | 1 | 1 | 0 | 0 | 1 | w0_enable = '1' |
| 0 | 0 | 1 | 1 | 1 | 1 | w1_enable = '1' |
| 0 | 0 | 0 | 1 | 1 | 0 | w2_enable = '0' |
| 1 | 1 | 0 | 0 | 0 | 0 | w3_enable = '0' |
| 1 | 1 | 1 | 0 | 1 | 0 | w0_enable = '1' |
| 0 | 1 | 0 | 1 | 1 | 1 | w1_enable = '0' |
| 0 | 0 | 0 | 1 | 0 | 1 | w2_enable = '1' |
| 1 | 0 | 1 | 0 | 0 | 0 | w3_enable = '0' |
| . | | | | | | |
| . | | | | | | |
| . | | | | | | |
| 0 | 1 | 0 | 1 | 0 | 0 | w0_enable = '0' |
| 1 | 0 | 0 | 0 | 1 | 0 | w1_enable = '0' |
| 1 | 0 | 1 | 0 | 1 | 1 | w2_enable = '1' |
| 0 | 1 | 1 | 1 | 0 | 1 | w3_enable = '1' |

FIG. 4 further includes a matrix error combiner 450 configured to receive the early/late indication signals from the plurality of sub-channels E/L$_{0-2}$, and to generate a final early/late decision to provide to aggregate wire delay block 460 to increment or decrement the stored delay values accordingly. As noted above and illustrated in Table I, in any given valid code sequence for some embodiments, only two sub-channels R$_0$-R$_2$ change. Thus, the E/L signal provided by the sub-channel that does not change is not useful, and logic may be included to omit the effects of such an indication. Nevertheless, the two sub-channels that do change will both provide E/L indications that are early or late, and thus the combination of such E/L indications will overcome the E/L indication of the non-transitioning sub-channel, and the final E/L indication provided by matrix error combiner 450 will remain valid.

Figure 10:
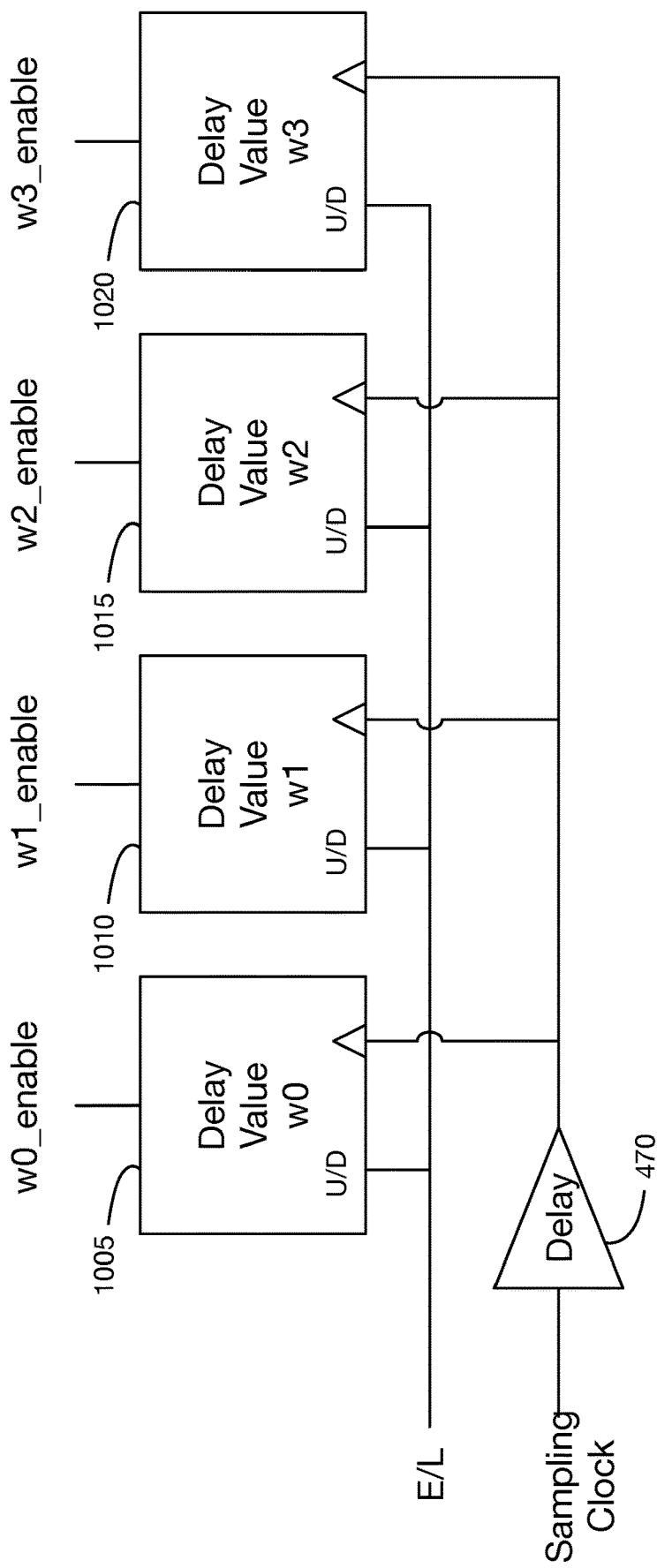
FIG. 10 is a block diagram of a circuit for aggregating wire delays, in accordance with some embodiments.

FIG. 10 illustrates an exemplary block diagram of aggregate wire delay block 460, in accordance with some embodiments. as shown, aggregate wire delay block includes four blocks 1005, 1010, 1015, and 1020; one for each wire of the multi-wire bus. In some embodiments, each block corresponds to a counter that may be selectably enabled according to the corresponding received wire delay adjustment enable signals w0-w3_enable. Each counter may also be configured to receive the E/L indication signal from the matrix error combiner 450, which may be used to control each counter to either count up or down (U/D), depending on the E/L indication signal. Each counter may increment according to a delayed 470 version of the sampling clock. In some embodiments, the values stored in each counter may be provided (e.g., as binary bits) to a respective wire delay adjustment circuit, as shown for example in FIG. 5.

Figure 13:
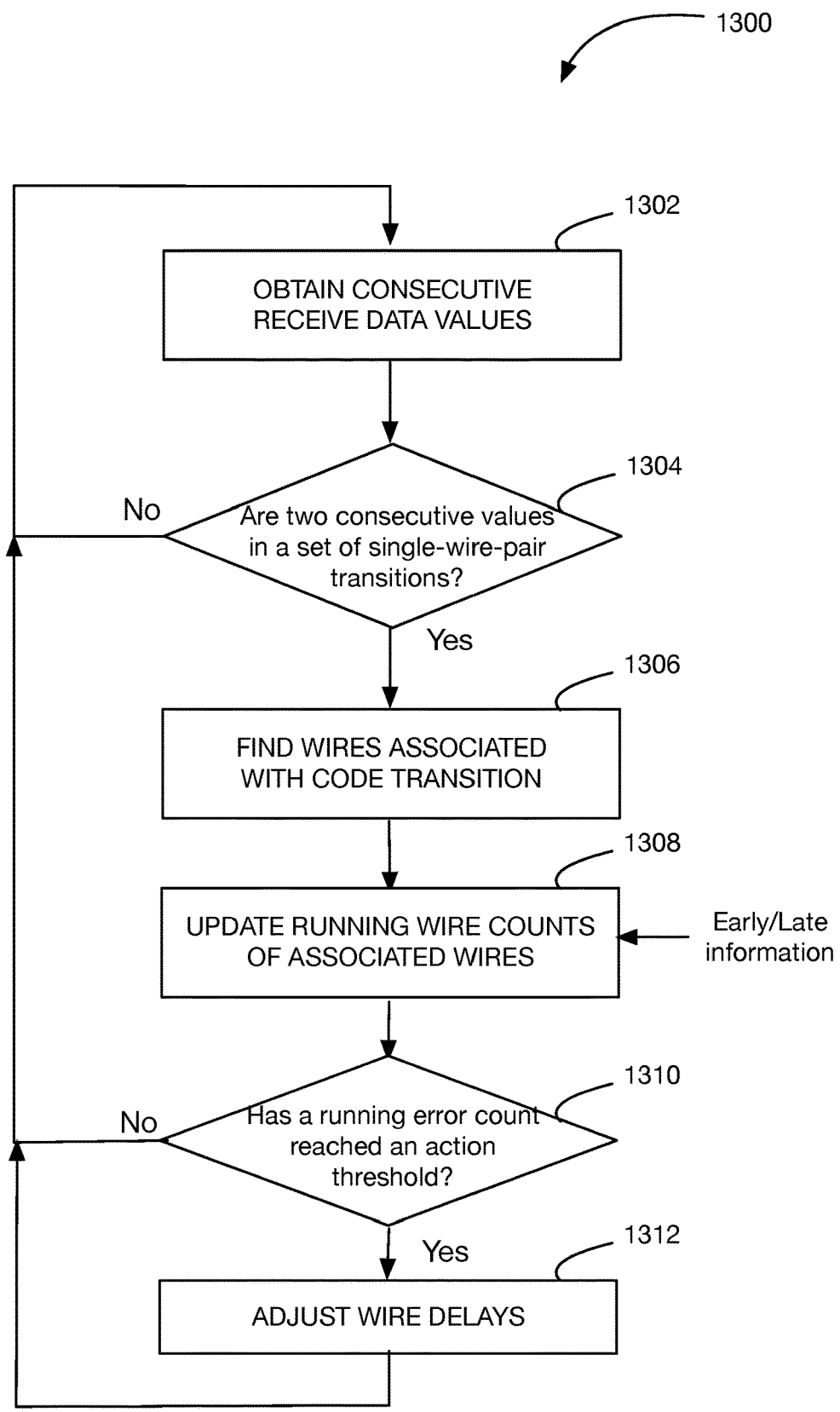
FIG. 13 is a block diagram of a method in accordance with some embodiments.

FIG. 13 illustrates a flowchart of a method 1300, in accordance with some embodiments. As shown, method 1300 includes obtaining consecutive received data values 1302. The received data values are analyzed 1304 to determine if the data corresponds to a set of single-wire-pair transitions. If the determination is "No", then the process starts again from the beginning for the next set of received data. If the determination is "Yes," the wires associated with the code transition are identified 1306, for example using control logic 910 described above with respect to Table II. Based on the identified wires, the running wire counts representing the aggregate delay values are updated 1308 based on the received E/L information. Once the running error counts reach an action threshold 1310, the wire delays are adjusted according to the stored error count 1312.

APPENDIX I

```
// VerilogA for sk, x_skewrec_avg, veriloga
`include "constants.vams"
`include "disciplines.vams"
module x_skewrec_avg(dm1, d0, cdrearly, cdrlate, clk, t0, t1, t2,
    t3, vdda, vssa);
electrical [2:0] dm1;
input [2:0] dm1;
electrical [2:0] d0;
input [2:0] d0;
electrical [2:0] cdrearly;
input [2:0] cdrearly;
electrical [2:0] cdrlate;
input [2:0] cdrlate;
electrical clk;
input clk;
electrical t0, t1,t2, t3; // outputs to control skew elements
output t0, t1, t2, t3;
electrical vdda, vssa;
inout vdda, vssa;
real t0i, t1i, t2i, t3i, vth, vote, tavg,incdecval;
integer id0, idm1;
analog begin
    vth = V(vdda, vssa) / 2.0; // digital slicer level for the
votes
    @(initial_step) begin // just set the value to default (like
a reset) at beginning of simulation
        t0i = 0.0;
        t1i = 0.0;
        t2i = 0.0;
        t3i = 0.0;
    end
    // for every clock cycle we update the skew values; this can
be dutycycled as the drift is slow in mission mode. this loop was
missing
    @(cross(V(clk,vssa),1)) begin
        // Actual bits from the three bits
        id0 = (V(d0[0], vssa) > vth) << 2 | (V(d0[1], vssa) >
vth) << 1 | (V(d0[2], vssa) > vth) << 0;
        // History bits D(n-1) across the three sub-channels
        idm1 = (V(dm1[0], vssa) > vth) << 2 | (V(dm1[1], vssa) >
vth) << 1 | (V(dm1[2], vssa) > vth) << 0;
        // increment/decrement value, defines time constant
        incdecval = 0.001p/10;
        // collect all the votes across sub-channels. Two sub-
channels are always toggling, one sub-channel is static and
should not contribute to votes (might need to enforce to ignore
the static channel. To be investigated)
        vote = 0.0;
        if(V(cdrearly[0],vssa) > vth) vote = vote + incdecval;
        else vote = vote − incdecval;
        if(V(cdrlate[0],vssa) > vth) vote = vote − incdecval;
        else vote = vote + incdecval;
        if(V(cdrearly[1],vssa) > vth) vote = vote + incdecval;
        else vote = vote − incdecval;
        if(V(cdrlate[1],vssa) > vth) vote = vote − incdecval;
        else vote = vote + incdecval;
        if(V(cdrearly[2],vssa) > vth) vote = vote + incdecval;
        else vote = vote − incdecval;
        if(V(cdrlate[2],vssa) > vth) vote = vote − incdecval;
        else vote = vote + incdecval;
        vote = −vote;
        // looking for patterns where the 1 moves from one wire to an
other one. −> id0 != idm1 has not been explicit defined but it is
implicit as for this the votes are zero sum (to be investigated
if it makes sense to add this statement for robustness).
        if((id0 == 7 || id0 == 1 || id0 == 2 || id0 == 4) &&
(idm1 == 7 || idm1 == 1 || idm1 == 2 || idm1 == 4)) begin
            case (id0) // update where the 1 has ended up
                7: t0i = t0i + vote;
                1: t1i = t1i + vote;
                2: t2i = t2i + vote;
```

APPENDIX I-continued

```
    4: t3i = t3i + vote;
    default: id0 = id0; // fake assignement
    endcase
  case (idm1) // update where the 1 initially was
    7: t0i = t0i + vote;
    1: t1i = t1i + vote;
    2: t2i = t2i + vote;
    4: t3i = t3i + vote;
    default: idm1 = idm1;// fake assignement
    endcase
  end
// looking for patterns where the −1 moves from one wire to
an other one. −> id0 != idm1 has not been explicit defined but it
is implicit as for this the votes are zero sum (to be
investigated if it makes sense to add this statement for
robustness).
  if((id0 == 0 || id0 == 6 || id0 == 5 || id0 == 3) &&
(idm1 == 0 || idm1 == 6 || idm1 == 5 || idm1 == 3)) begin
    case (id0) // update where the −1 has ended up
      0: t0i = t0i + vote;
      6: t1i = t1i + vote;
      5: t2i = t2i + vote;
      3: t3i = t3i + vote;
      default: id0 = id0; // fake assignement
    endcase
    case (idm1) // update where the −1 initially was
      0: t0i = t0i + vote;
      6: t1i = t1i + vote;
      5: t2i = t2i + vote;
      3: t3i = t3i + vote;
      default: idm1 = idm1; // fake assignement
    endcase
  end
// figuring out the absolute value
tavg = ( t0i + t1i + t2i + t3i ) / 4;
// and subtraction it (enforcing it to zero)
t0i = t0i − tavg;
t1i = t1i − tavg;
t2i = t2i − tavg;
t3i = t3i − tavg;
  // saturation logic
  if(t0i > 12.5p) t0i = 12.5p;
  if(t0i < −12.5p) t0i = −12.5p;
  if(t1i > 12.5p) t1i = 12.5p;
  if(t1i < −12.5p) t1i = −12.5p;
  if(t2i > 12.5p) t2i = 12.5p;
  if(t2i < −12.5p) t2i = −12.5p;
  if(t3i > 12.5p) t3i = 12.5p;
  if(t3i < −12.5p) t3i = −12.5p;
end // end of the cross function resp. clk
// assignement to the output. Will be feed into veriloga skew
elements (e.g. absdelay is used to shift/delay the signal in
time)
  V(t0, vssa) <+ laplace_nd(t0i + 12.5p +5p, {1, 0}, {1, 2e−
12});
  V(t1, vssa) <+ laplace_nd(t1i + 12.5p +5p, {1, 0}, {1, 2e−
12});
  V(t2, vssa) <+ laplace_nd(t2i + 12.5p +5p, {1, 0}, {1, 2e−
12});
  V(t3, vssa) <+ laplace_nd(t3i + 12.5p + 5p, {1, 0}, {1, 2e−
12});
end
endmodule
```

The invention claimed is:

1. A method comprising:
generating, during a first and second signaling interval, an aggregated data signal by forming a linear combination of at least three wire signals received at a multi-input comparator (MIC) in parallel from wires of a multi-wire bus, wherein at least two of the wire signals undergo a signal level transition during the first and second signaling interval, and wherein the aggregated data signal is representative of a sub-channel data signal of an orthogonal differential code;
obtaining a signal skew measurement of the aggregated data signal in response to a transition time of the aggregated data signal at an output of the MIC; and,
adjusting a signal skew of the aggregated data signal by updating wire-specific skew offset values of the at least two wires undergoing the signal level transition based on the signal skew measurement.

2. The method of claim 1 wherein each wire-specific skew offset value is also updated based on a magnitude of the signal level transition on a specific wire.

3. The method of claim 2 wherein the magnitude of the signal level transition on a specific wire is determined according to an identified codeword transition.

4. The method of claim 1 wherein the wire-specific skew offset values are updated in response to a counter value exceeding a threshold.

5. The method of claim 1 wherein the linear combination is formed in accordance with elements of a row of an orthogonal matrix.

6. The method of claim 1 further comprising generating at least one wire-specific skew control signal.

7. The method of claim 6 wherein the at least one wire-specific skew control signal is used to control a capacitive loading on a corresponding wire at a receiver to update the wire-specific skew offset value of the corresponding wire.

8. The method of claim 6 wherein the at least one wire-specific skew control signal is conveyed to a transmitter.

9. A method comprising:
receiving a sequence of orthogonal codewords, each codeword having a plurality of codeword signal elements received in parallel over respective wires of a multi-wire bus;
for each codeword in the sequence of codewords:
forming a set of weighted sums of the codeword signal elements, each sum being formed by a corresponding multi-input comparator (MIC);
identifying a codeword data value based on the set of weighted sums;
determining a skew measurement from one or more of the weighted sums in the set of weighted sums;
identifying a predetermined sequence of codewords and responsively determining a set of wire-specific skew offset values based on the predetermined sequence and the skew measurement; and,
generating one or more wire-specific skew control signals.

10. The method of claim 9 wherein the MIC weights correspond to rows of an orthogonal matrix.

11. The method of claim 9 wherein determining a skew measurement from one or more of the weighted sums in the set of weighted sums is performed via a slicer selected from a prior data value.

12. The method of claim 9 wherein determining a skew measurement from one or more of the weighted sums in the set of weighted sums is performed via oversampling.

13. The method of claim 9 wherein determining a skew measurement from one or more of the weighted sums in the set of weighted sums is performed via regular baud sampling on a ½ rate test pattern.

14. The method of claim 9 wherein the predetermined sequence of codewords includes a plurality of sequences, and different sequences have different wire-specific skew offset values.

15. An apparatus comprising:
a plurality of multi-wire signal combiners, each configured to form an aggregate data signal from codeword component signals received on a multi-wire bus;

a skew measurement circuit configured to generate a skew measurement signal from one or more of the aggregate data signals;

a codeword sequence detector configured to identify one or more predetermined sequences of codewords and responsively output a set of wire-specific skew offset values; and, a skew control signal generator configured to generate one or more wire-specific skew control signals.

16. The apparatus of claim 15 wherein the skew control signal generator comprises a plurality of counters.

17. The apparatus of claim 16 wherein the codeword sequence detector is connected to the plurality of counters to increment or decrement the counters in proportion to a wire-specific transition level.

18. The apparatus of claim 16 wherein the codeword sequence detector is connected to the plurality of counters to increment or decrement the counters in response to an identified transition sequence.

19. The method of claim 1, wherein the wire-specific skew offset values of the at least two wires undergoing the signal level transition are updated by equal amounts.

20. The method of claim 9, wherein determining the set of wire-specific skew offset values comprises updating each wire-specific skew offset value by an equal amount.

* * * * *